US012783603B2

(12) United States Patent
Yang

(10) Patent No.: US 12,783,603 B2
(45) Date of Patent: Nov. 3, 2026

(54) MEASURING THE EFFECTS OF AUGMENTATION ARTIFACTS ON A MACHINE LEARNING NETWORK

(71) Applicant: NVIDIA Corporation, Santa Clara, CA (US)

(72) Inventor: Zongyi Yang, Eatontown, NJ (US)

(73) Assignee: NVIDIA Corporation, Santa Clara, CA (US)

( * ) Notice: Subject to any disclaimer, the term of this patent is extended or adjusted under 35 U.S.C. 154(b) by 255 days.

(21) Appl. No.: 18/791,867

(22) Filed: Aug. 1, 2024

(65) Prior Publication Data

US 2024/0394337 A1 Nov. 28, 2024

Related U.S. Application Data

(63) Continuation of application No. 17/448,249, filed on Sep. 21, 2021, now Pat. No. 12,086,208.

(Continued)

(51) Int. Cl.
*G06F 18/214* (2023.01)
*G06N 3/08* (2023.01)
(Continued)

(52) U.S. Cl.
CPC ............. *G06F 18/214* (2023.01); *G06N 3/08* (2013.01); *G06N 20/00* (2019.01); *G06T 15/20* (2013.01)

(58) Field of Classification Search
CPC ..... G06F 18/214; G06F 18/2115; G06N 3/08; G06N 20/00; G06N 3/045; G06N 3/0464;
(Continued)

(56) References Cited

U.S. PATENT DOCUMENTS 10,885,698 B2 1/2021 Muthler et al.
11,042,163 B2 6/2021 Chen et al.
(Continued)

FOREIGN PATENT DOCUMENTS

WO WO-2021177943 A1 * 9/2021 ........... G06N 3/0455

OTHER PUBLICATIONS

Hoo-Chang Shin et al: "Medical Image Synthesis for Data Augmentation and Anonymization using Generative Adversarial Networks", arxiv.org, Cornell University Library, 201 Olin Library Cornell University Ithaca, NY 14853 f vol. Version 2 Sep. 13, 2018 (Sep. 13, 2018), pp. 1-11, (Year: 2018).*
(Continued)

*Primary Examiner* — Charles T Shedrick
(74) *Attorney, Agent, or Firm* — IRON SUMMIT IP LLP

(57) ABSTRACT

In various examples, sets of testing data may be selected and applied to an MLM such that differences in performance of the MLM in the testing between the sets indicates and may be used to determine whether and/or an extent by which the MLM is trained to rely on artifacts. Training data for the MLM may be generated using a first value of a parameter that defines a value of a characteristic of the training data. For testing, first testing data may be selected that corresponds to a second value of the parameter that shifts the value in a first direction and second testing data may be selected that corresponds to a third value of the parameter that shifts the value in a second direction (e.g., opposite the first direction). Various possible actions may be taken based on results of analyzing the differences in performance.

20 Claims, 12 Drawing Sheets

Related U.S. Application Data

(60) Provisional application No. 63/081,003, filed on Sep. 21, 2020.

(51) Int. Cl.
*G06N 20/00* (2019.01)
*G06T 15/20* (2011.01)

(58) Field of Classification Search
CPC .......... G06N 3/063; G06N 3/09; G06T 15/20; G06V 10/764; G06V 10/771; G06V 10/82; G06V 20/20; G06V 20/56
See application file for complete search history.

(56) References Cited

U.S. PATENT DOCUMENTS

| | | | | |
|---|---|---|---|---|
| 12,086,208 | B2 | 9/2024 | Yang | |
| 2019/0354895 | A1* | 11/2019 | Vasudevan | G06F 18/217 |
| 2019/0384303 | A1 | 12/2019 | Muller et al. | |
| 2020/0302100 | A1* | 9/2020 | Teplinsky | G06N 20/00 |
| 2020/0324795 | A1 | 10/2020 | Bojarski et al. | |
| 2020/0339109 | A1 | 10/2020 | Hong et al. | |
| 2020/0364953 | A1* | 11/2020 | Simoudis | B60K 35/00 |
| 2021/0142470 | A1* | 5/2021 | Meng | G06N 3/09 |
| 2021/0279453 | A1* | 9/2021 | Luqman | G06F 18/2431 |
| 2021/0284184 | A1* | 9/2021 | Song | B60W 50/06 |
| 2021/0366205 | A1* | 11/2021 | Juppe | G06F 18/214 |
| 2021/0406679 | A1 | 12/2021 | Wen et al. | |
| 2022/0084229 | A1* | 3/2022 | Guizilini | G06T 3/18 |
| 2022/0273170 | A1* | 9/2022 | Yasuno | A61B 3/102 |
| 2023/0108319 | A1* | 4/2023 | Narayanaswamy | G06T 7/0012 382/156 |
| 2023/0368121 | A1* | 11/2023 | Carrillo Garcia | G06Q 10/0831 |

OTHER PUBLICATIONS

IEC 61508, "Functional Safety of Electrical/Electronic/Programmable Electronic Safety-related Systems," https://en.wikipedia.org/wiki/IEC_61508, accessed on Apr. 1, 2022, 7 pgs.
ISO 26262, "Road vehicle—Functional safety," International standard for functional safety of electronic system, https://en.wikipedia.org/wiki/ISO_26262, accessed on Sep. 13, 2021, 8 pgs.
"Taxonomy and Definitions for Terms Related to Driving Automation Systems for On-Road Motor Vehicles", Society of Automotive Engineers (SAE), Standard No. J3016-201609, pp. 30 (Sep. 30, 2016).
"Taxonomy and Definitions for Terms Related to Driving Automation Systems for On-Road Motor Vehicles", Society of Automotive Engineers (SAE), Standard No. J3016-201806, pp. 35 (Jun. 15, 2018).
Yang, Zongyi; International Preliminary Report on Patentability for PCT Application No. PCT/US2021/051244, filed Sep. 21, 2021, mailed Mar. 30, 2023, 10 pgs.
Yang, Zongyi; Non-Final Office Action for U.S. Appl. No. 17/448,249, filed Sep. 21, 2021, mailed Dec. 21, 2023, 30 pgs.
Shin, et al.; "Medical Image Synthesis for Data Augmentation and Anonymization using Generative Adversarial Networks," Cornell University Library, arXiv: 1807.10225v2, Sep. 13, 2018, 11 pgs.
Mowla, et al.; "On-Device AI-Based Cognitive Detection of Bio-Modality Spoofing in Medical Cyber Physical System," in IEEE Access, vol. 7, 2019, doi: 10.1109/ACCESS.2018.2887095, 13 pgs.
Yang, Zongyi; Notice of Allowance for U.S. Appl. No. 17/448,249, filed Sep. 21, 2021, mailed May 31, 2024, 6 pgs.
Zhang, et al.; "A study on overfitting in deep reinforcement learning," arXiv preprint arXiv:1804.06893; Apr. 20, 2018, 25 pgs.
Bojarski, et al.; "The NVIDIA PilotNet Experiments," arXiv:2010.08776, Oct. 17, 2020, 28 pgs.
Le, et al.; "Using Synthetic Data to Train Neural Networks is Model-Based Reasoning," Cornell University Library, arXiv:1703.00868, Mar. 2, 2017, 8 pgs.
International Search Report and Written Opinion for PCT Application No. PCT/US2021/051244, filed Sep. 21, 2021, mailed Jan. 7, 2022, 13 pgs.

* cited by examiner

MEASURING THE EFFECTS OF AUGMENTATION ARTIFACTS ON A MACHINE LEARNING NETWORK

CROSS-REFERENCE TO RELATED APPLICATIONS

This application is a continuation of U.S. patent application Ser. No. 17/448,249, filed Sep. 21, 2021, which claims the benefit of U.S. Provisional Application No. 63/081,003, filed on Sep. 21, 2020. Each of which is hereby incorporated by reference in its entirety.

BACKGROUND

Collecting real-world data for training and testing machine learning models (MLMs)—such as neural networks—is a laborious, costly, and time consuming task that requires countless human and compute resources. Even where sufficient resources are available, certain scenarios that should be captured to produce a robust model may be rare or unsafe to capture. To combat this issue, synthetic data generation has emerged as a solution to generate ground truth information. Synthetic data may be generated using three-dimensional (3D) graphics techniques to simulate the real-world. In some approaches, real-world data may be transformed to generate the synthetic data for training or testing, such as to augment training sets. However, synthetic data can include artifacts that are correlated with the ground truth information so that an MLM may make predictions based on the artifacts. When deployed in the real-world, these artifacts may not be present, resulting in a poorly performing MLM.

However, learning from artifacts in synthetic data may result in overfitting of network learning, where a network learns to disproportionately weigh synthetic data and create undesirable and inaccurate associations. Conventional techniques for detecting overfitting may divide available data into a portion for testing an MLM and a portion for training the MLM. Performance of the MLM may be measured by comparing the percentage of accuracy observed in both data sets to conclude on the presence of overfitting. If the model performs better on the training set than on the test set, the model may be overfitting. However, overfitting techniques are often unable to detect whether the MLM is using artifacts to make predictions or to measure the extent of the reliance on the artifacts. Such an example is where synthetic data is used for both training and testing and artifacts are present in both data sets. For example, the MLM is able to leverage the artifacts in both training and testing sets so that overfitting techniques cannot detect this behavior. While real-world data that does not include the artifacts could be used for testing, real-world tests can be time-consuming, expensive, and pose safety concerns.

SUMMARY

Embodiments of the present disclosure relate to measuring the effects of augmentation artifacts on a network. Systems and methods are disclosed that allow for the detection of whether a trained MLM(s) is relying on artifacts to make predictions and the determination of an extent by which a trained MLM(s) is relying on artifacts to make predictions.

In contrast to conventional approaches, such as those described above, multiple sets of testing data may be selected and applied to an MLM such that differences in performance of the MLM in the testing between the sets indicates whether and/or an extent by which the MLM is trained to rely on artifacts. In at least one embodiment, the MLM may be trained using training data generated using a first value of a parameter that defines at least one value of at least one characteristic of the training data. For example, where the training data includes artifacts, the parameter may define or influence the correlation between artifacts in the training data and corresponding ground truth data. For testing, a first set of testing data may be selected that corresponds to a second value of the parameter that shifts the at least one value in a first direction and a second set of testing data may be selected that corresponds to a third value of the parameter that shifts the at least one value in a second direction (e.g., opposite the first direction).

Differences in performance of the MLM in the testing between the sets may be used to determine whether and/or an extent by which the MLM is trained to rely on artifacts. Disclosed approaches may display data indicating the difference in performance of the MLM on a client device, such as one or more reliance indicators and/or a reliance score. Various possible actions may be taken based on the results of analyzing the difference in performance. For example, an MLM with a performance score under a threshold (indicating a low correlation with artifacts) may be deployed and/or further tested using real-world data. An MLM with a low performance score may be retrained (e.g., using an untrained version of the MLM) using a different training method and/or modified (e.g., by replacing one or more portions of the head of the network and performing further training with data that does not include the artifacts).

BRIEF DESCRIPTION OF THE DRAWINGS

The present systems and methods for measuring the effects of augmentation artifacts on a machine learning are described in detail below with reference to the attached drawing figures, wherein.

DETAILED DESCRIPTION

Figure 1:
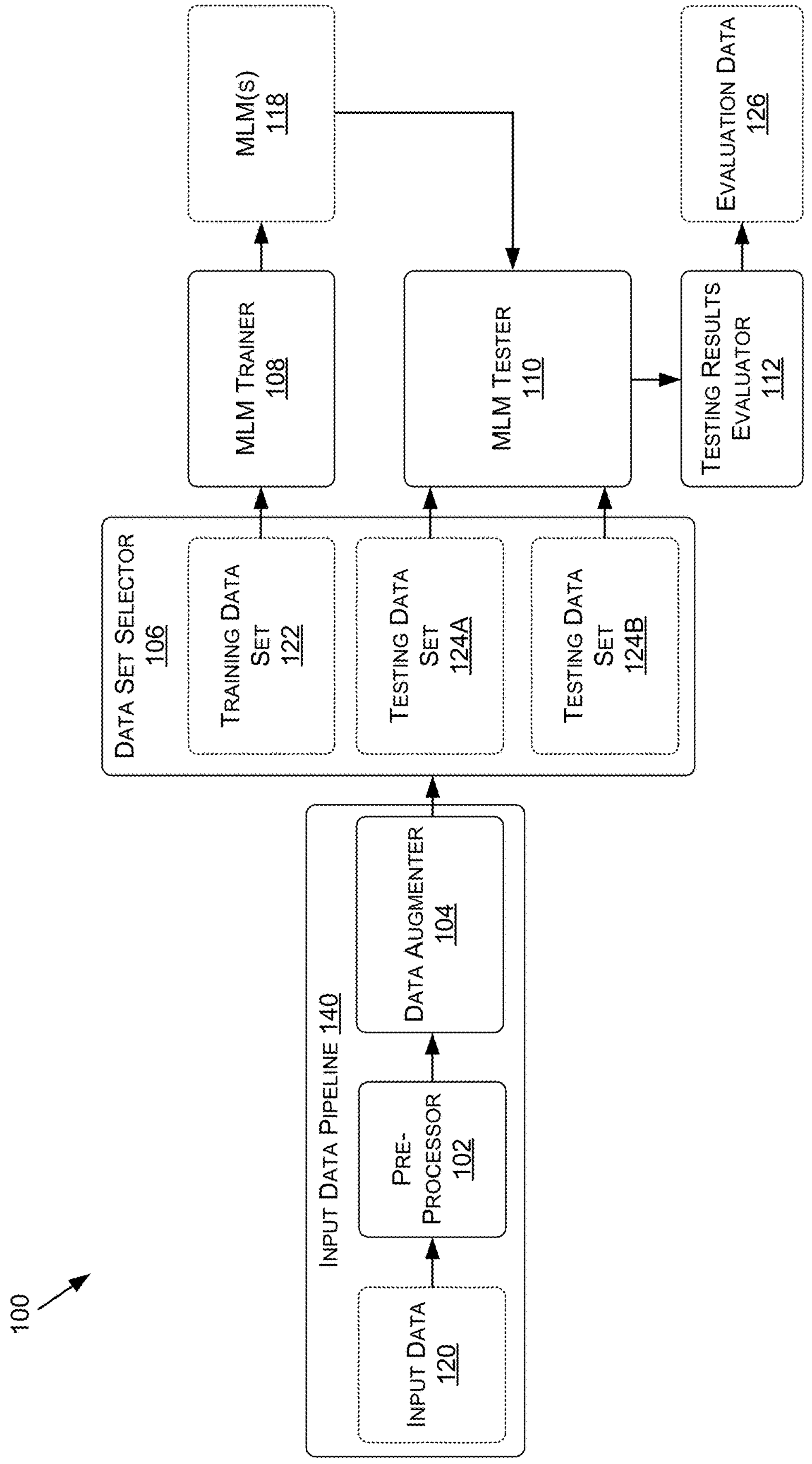
FIG. 1 is a data flow diagram illustrating an example of a machine learning model analysis system performing a process for measuring the effects of augmentation artifacts on a machine learning model, in accordance with some embodiments of the present disclosure.

Systems and methods are disclosed related to measuring the effects of augmentation artifacts on a machine learning. Although the present disclosure may be described with respect to an example autonomous vehicle 700 (alternatively referred to herein as "vehicle 700" or "ego-vehicle 700," an example of which is described with respect to FIGS. 7A-7D), this is not intended to be limiting. For example, the systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to autonomous driving, this is not intended to be limiting, and the systems and methods described herein may be used in augmented reality, virtual reality, mixed reality, robotics, security and surveillance, autonomous or semi-autonomous machine applications, and/or any other technology spaces where machine learning may be used.

Embodiments of the present disclosure relate to measuring the effects of augmentation artifacts on a machine learning. Systems and methods are disclosed that allow for the detection of whether a trained MLM(s) is relying on artifacts to make predictions (which may refer to inferences anywhere used herein) and the determination of an extent by which a trained MLM(s) is relying on artifacts to make predictions.

In various respects, sets of testing data may be selected and applied to an MLM such that differences in performance of the MLM in the testing between the sets indicates whether and/or an extent by which the MLM is trained to rely on artifacts. In at least one embodiment, the MLM may be trained using training data generated using a first value of a parameter that defines at least one value of at least one characteristic of the training data. For example, where the training data includes artifacts, the parameter may define or influence the correlation between artifacts in the training data and corresponding ground truth data. For testing, a first set of testing data may be selected that corresponds to a second value of the parameter that shifts the at least one value in a first direction and a second set of testing data may be selected that corresponds to a third value of the parameter that shifts the at least one value in a second direction (e.g., opposite the first direction). Due to the shifting of the value(s) of a characteristic in different directions, a difference in performance of the MLM between the test sets can indicate whether the one or more characteristics are correlated with ground truth data of the training data, even where both sets were generated using the same or similar techniques (e.g., both synthetic data generated using the same algorithms). For example, shifting a value in different directions can be used to account for potential bias in the MLM that is not due to artifacts, as further described herein.

In one or more embodiments, the MLM (e.g., a neural network) may be trained using training data generated from first sensor data captured from a first perspective corresponding to a vehicle and ground truth data associated with the first sensor data. For example, the first perspective may correspond to a forward-facing camera mounted at or near a center of the vehicle. To generate the first set of training data so that values of one or more characteristics of the training data are shifted in a first direction, a second perspective may be used that has at least one value of at least one parameter offset from the first perspective in a first direction. For example, the location and/or orientation of the second perspective may be shifted left. To generate the second set of training data so that values of one or more characteristics of the training data are shifted in a second direction, a third perspective may be used that has at least one value of at least one parameter offset from the first perspective in a second direction. For example, the location and/or orientation of the second perspective may be shifted right.

Where the training data and the testing data include artifacts related to the parameter of the perspectives, the differences in performance between the training sets may indicate a reliance of the MLM on the artifacts in making predictions. This may result where the artifacts are correlated with ground truth data used to the train the MLM. To illustrate an example, the MLM may be trained to predict ground truth labels corresponding to a trajectory for a vehicle centered in a lane. To augment the training data, original images (e.g., images as captured by a camera) may be shifted, rotated, or otherwise perturbed to generate transformed (or augmented) synthetic images (e.g., using viewpoint transforms). The original images may capture a human driving approximately centered in the lane. Thus, artifacts in the transformed images may indicate the center of the lane, providing a correlation with ground truth labels. By shifting the perspectives for training sets, if the artifacts indicate shifted center positions, the MLM may be relying on the artifacts, as reflected in the MLM performance. Further, shifting the perspectives for testing sets in multiple directions (e.g., left and right), can help distinguish between a poorly trained network and a network relying on artifacts. For example, the MLM may be biased in one direction and perform well for one data set, but not be relying on artifacts. Such bias can be accounted for by evaluating how the MLM performs in multiple directions (e.g., the combination of poor left and right performance may indicate a reliance on artifacts).

In at least one embodiment, data used to generate the testing data can be collected by driving the same route twice, first with the human driving close to the left edge of the lane, and later, with the human driving close to the right edge of the same lane. As further examples, the route may be driven once (or fewer times) with multiple cameras located at different positions on the vehicle (e.g., a left-biased camera and a right biased camera). In one or more embodiments, real-world data for the training data and testing data may be captured in one driving route, for example, using a camera for each set of data (e.g., three cameras).

While two different directions are described, any number of directions may be used to vary the data. Further, at least some disclosed approaches are not limited to synthetic artifacts or synthetic training or testing data. For example, MLM reliance may be detected and/or measured for artifacts which may appear in real-world data or synthetic data as out-of-domain content or artifacts. An example of out-of-domain content or artifacts is an MLM relying on headlights or steering wheel positions rather than perimeter lines of the road and lane markings to learn to follow the road. In one or more embodiments, artifacts may not be detectable or easily perceived by the human eye. Examples include those related to subtle changes to pixel values, for example, those due to different shutter speeds like chromatic aberration.

Disclosed approaches may display data indicating the difference in performance of the MLM on a client device, such as one or more reliance indicators and/or a reliance score. Various possible actions may be taken based on the results of analyzing the difference in performance. For example, an MLM with a performance score under a threshold (indicating a low correlation with artifacts) may be deployed and/or further tested using real-world data. An MLM with a low performance score may be retrained (e.g., using an untrained version of the MLM) using a different training method and/or modified (e.g., by replacing one or more portions of the head of the network and performing further training with data that does not include the artifacts).

With reference to FIG. 1, FIG. 1 is a data flow diagram illustrating an example of a machine learning model (MLM) analysis system 100 performing a process for measuring the effects of augmentation artifacts on an MLM, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 700 of FIGS. 7A-7D, example computing device 800 of FIG. 8, and/or example data center 900 of FIG. 9.

The MLM analysis system 100 may include, amongst other elements, an input data pipeline 140, a data set selector 106, an MLM trainer 108, an MLM tester 110, and a testing results evaluator 112. In the example shown, the input data pipeline 140 includes a pre-processor 102 and a data augmenter 104.

As an overview, the input data pipeline 140 may be configured to generate, process, pre-process, augment, and/or otherwise prepare input data for use in training an MLM(s) and/or testing an MLM(s), such as an MLM(s) 118.

In embodiments that include the pre-processor 102, the pre-processor 102 may be configured to perform pre-processing on input data (e.g., real-world data), such as input data 120 (e.g., sensor data and/or image data). In embodiments that include the data augmenter 104, the data augmenter 104 may be configured to augment the input data, which may include generating synthetic and/or simulated input data using the input data (e.g., after pre-processing). The data set selector 106 may be configured to select from the prepared input data any number of data sets used for training an MLM and/or testing an MLM(s), such as a training data set 122 for training an MLM 118 and testing data sets 124A and 124B for testing the MLM 118. The MLM trainer 108 may use the training data set(s) selected by the data set selector 106 to train the MLM(s). The MLM tester 110 may use the testing data set(s) selecting by the data set selector 106 to test the MLM(s) (e.g., after and/or during training). The testing results evaluator 112 may be configured to evaluate the results of the testing to generate evaluation data 126, which may indicate whether and/or how much the MLM(s) is affected by augmentation artifacts which may be produced using the data augmenter 104. Various possible actions may be taken based on the evaluation data, examples of which are described herein.

The MLM analysis system 100 is described by way of example and not limitation, with respect to an MLM(s) trained for use in computer vision and/or perception operations to navigate a vehicle. However, aspects of the disclosure are more widely applicable to any form of MLM used for any purpose. In disclosed examples, the MLM(s) 118 may be trained to predict trajectory points, a vehicle orientation (e.g., with respect to features of the environment, such as lane markings), and/or a vehicle state (e.g., with respect to an object maneuver, such as a lane change, a turn, a merge, etc.), which may be used for controlling an autonomous vehicle. However, the evaluation data 126 may generally be produced for any type of MLM.

Additionally, the input data pipeline 140 is one example of an input data pipeline 140, which may be used in at least one embodiment, such as for training and/or testing an MLM(s) for use in computer vision and/or perception operations to navigate a vehicle, or for other purposes. However, aspects of the disclosure are more widely applicable to any form of input data pipeline 140, which may include more, fewer, and/or different components and/or processing paths than what is shown in FIG. 1.

In at least one embodiment, the input data 120 may include image data, sensor data, simulation data, synthetic data, and/or other data types (e.g., map data). By way of example and not limitation, the image data may include data representative of images of a field(s) of view of one or more cameras of a vehicle (e.g., real/physical cameras or simulated), such as stereo camera(s) 868, wide-view camera(s) 870 (e.g., fisheye cameras), infrared camera(s) 872, surround camera(s) 874 (e.g., 360 degree cameras), long-range and/or mid-range camera(s) 898, and/or other camera type of the vehicle 700. In some examples, the image data may be captured by a single camera with a forward-facing, substantially centered field of view with respect to a horizontal axis (e.g., left to right) of the vehicle 700. In a non-limiting embodiment, one or more forward-facing cameras may be used (e.g., a center or near-center mounted camera(s)), such as a wide-view camera 770, a surround camera 774, a stereo camera 768, and/or a long-range or mid-range camera 798. In some examples, more than one camera or other real or virtual sensor (e.g., LIDAR sensor, RADAR sensor, etc.) may be used to incorporate multiple fields of view (e.g., the fields of view of the long-range cameras 798, the forward-facing stereo camera 768, and/or the forward facing wide-view camera 770 of FIG. 7B).

In some examples, the image data may be captured in one format (e.g., RCCB, RCCC, RBGC, etc.), and then converted (e.g., by the pre-processor 102) to another format. Many types of images or formats may be used for the input data 120, for example, compressed images such as in Joint Photographic Experts Group (JPEG), Red Green Blue (RGB), or Luminance/Chrominance (YUV) formats, compressed images as frames stemming from a compressed video format such as H.264/Advanced Video Coding (AVC) or H.265/High Efficiency Video Coding (HEVC), raw images such as originating from Red Clear Blue (RCCB), Red Clear (RCCC) or other type of imaging sensor. It is noted that different formats and/or resolutions could be used training the machine learning model(s) 118 than for inferencing (e.g., during deployment and/or testing of the machine learning model(s) 118).

In some embodiments, one or more portions of the pre-processor 102 may implement a pre-processing image pipeline to process a raw image(s) acquired by a sensor(s) (e.g., camera(s)) and included in the image data to produce pre-processed image data which may represent an input image(s) to the machine learning model(s) 118. An example of a suitable pre-processing image pipeline may use a raw RCCB Bayer (e.g., 1-channel) type of image from the sensor and convert that image to a RCB (e.g., 3-channel) planar image stored in Fixed Precision (e.g., 16-bit-per-channel) format. The pre-processing image pipeline may include decompanding, noise reduction, demosaicing, white balancing, histogram computing, and/or adaptive global tone mapping (e.g., in that order, or in an alternative order).

Where noise reduction is employed by the pre-processor 102, it may include bilateral denoising in the Bayer domain. Where demosaicing is employed by the pre-processor 102, it may include bilinear interpolation. Where histogram computing is employed by the pre-processor 102, it may involve computing a histogram for the C channel, and may be merged with the decompanding or noise reduction in some examples. Where adaptive global tone mapping is employed by the pre-processor 102, it may include performing an adaptive gamma-log transform. This may include calculating a histogram, getting a mid-tone level, and/or estimating a maximum luminance with the mid-tone level.

In various examples, the input data 120 may include the sensor data generated by any number of sensors, such as LIDAR sensor(s) 764, RADAR sensor(s) 760, ultrasonic sensor(s) 762, microphone(s) 796, and/or other sensor types. The sensor data may represent fields of view and/or sensory fields of sensors (e.g., LIDAR sensor(s) 764, RADAR sensor(s) 760, etc.), and/or may represent a perception of the environment by one or more sensors (e.g., a microphone(s) 796). Sensors such as image sensors (e.g., of cameras), LIDAR sensors, RADAR sensors, SONAR sensors, ultrasound sensors, and/or the like may be referred to herein as perception sensors or perception sensor devices, and the sensor data generated by the perception sensors may be referred to herein as perception sensor data. In some examples, an instance or representation of the sensor data may be represented by an image (e.g., the image data) captured by an image sensor, a depth map generated by a LIDAR sensor, and/or the like. LIDAR data, SONAR data, RADAR data, and/or other sensor data types may be correlated with, or associated with, image data generated by one or more image sensors. For examples, image data representing one or more images may be updated to include data related to LIDAR sensors, SONAR sensors, RADAR sensors, and/or the like, such that the sensor data used for training and/or input to the MLM 118 may be more informative or detailed than image data alone. As such, the MLM 118 may learn to generate predictions using this additional information from any number of perception sensors.

In embodiments where the sensor data is used, the sensors may be calibrated such that the sensor data is associated with pixel coordinates in the image data. The pre-processor 102 may perform pre-processing on the sensor data, which may be similar to that of pre-processing described herein with respect to image data. In some embodiments, such as where the sensor data is indicative of depth (e.g., RADAR data, LIDAR data, etc.), the depth values may be correlated with pixel coordinates in the image data, and then used as an additional (or alternative, in some examples) input to the machine learning model(s) 118. For example, one or more of the pixels may have an additional value associated with it that is representative of depth, as determined from the sensor data.

As described herein, the input data 120 may include other data types, such as map data. The map data may be used by the machine learning model(s) 118 to generate outputs. For example, the map data may include low-resolution map data (e.g., screenshots of a 2D map application with or without guidance). This low-resolution map data may include a basic geometry of the road and/or intersections, such as without additional information such as lane markings, number of lanes, locations of sidewalks, streetlights, stop signs, etc. In other words, in contrast with the map data representing an HD map (e.g., the HD map and/or the HD maps described herein and relied upon by conventional systems), the map data may be less data intense, and used only as an additional data point by the machine learning model(s) 118 when computing outputs.

The map data, in some examples, may include a screenshot or an image (or data representative thereof) that depicts a current lane of the vehicle, a destination lane of the vehicle, the vehicle itself, and/or a representation of the path for the vehicle to take through the lane change. In some examples, the path of the vehicle used for the map data for training may be automatically generated during human-piloted portions of vehicle operation (e.g., as the vehicle is controlled through the environment, the path is populated over the map). In examples, the map data may include commands, such as "at the next intersection, turn right," or the like, and the machine learning model(s) 118 may use this information to generate predictions. In any example, the map data may be generated automatically (e.g., during piloting of the car by a human) and/or may be generated by manual labeling.

In one or more embodiments, at least some of the input data may be generated using a simulator, such as a simulator(s) that is configured to render or otherwise determine images and/or sensor data inputs from one or more virtual environments (e.g., a 3D representation and/or simulation of the real-world). In one or more embodiments, the input data 120 may include all real input data, all simulated or synthetic input data or some combination thereof. Where simulated or synthetic input data is included in the input data 120, that data may or may not be provided to a data augmenter 104 for augmentation. For example, at least some of the functionality of the pre-processor 102 and/or the data augmenter 104 may not be needed due to the simulator and/or may be incorporated into or otherwise accounted for using the simulator.

As described herein, the data augmenter 104 may be configured to augment the input data 120, which may include generating synthetic and/or simulated input data using the input data (e.g., after pre-processing). The augmentation may result in additional input data available for selection by the data set selector 106 for training and/or testing datasets, providing for a more robustly trained MLM and/or providing data suitable for use in measuring and/or detecting the effects of artifacts on a trained MLM.

The data augmenter 104 may use any suitable techniques to perform augmentation to increase the amount of input data available for training and/or testing the MLM 118. For example, the data augmenter 104 may modify or transform the input data 120 to add slightly modified copies of already existing input data and/or newly created synthetic input data. In one or more embodiments, transformation of input data may include one or more geometric transformations, such as flipping or mirroring, color modification, cropping, rotation, noise injection and/or random erasing.

Additionally or alternatively, transformation of input data may include the sourcing and/or generation of entirely new and/or synthetic input data (e.g., images or input sets) through various techniques to create new synthetic input data. For example, one or more Generative Adversarial Networks (GANs) may be used by the data augmenter 104 to generate synthetic input data. Additionally or alternatively, synthetic input data may be generated using three-dimensional (3D) graphics techniques to simulate the real-world. One or more of these techniques may include generating rendered images and/or sensor data inputs from one or more virtual environments (e.g., from a 3D representation and/or simulation of the real-world which may use a simulator as described herein). Additionally or alternatively, input data may be transformed using 3D graphics techniques to generate the synthetic data. For example, one or more viewpoint transformations may be applied to real-world image data to generate synthetic image data, as further described with respect to FIG. 2.

Figure 2:
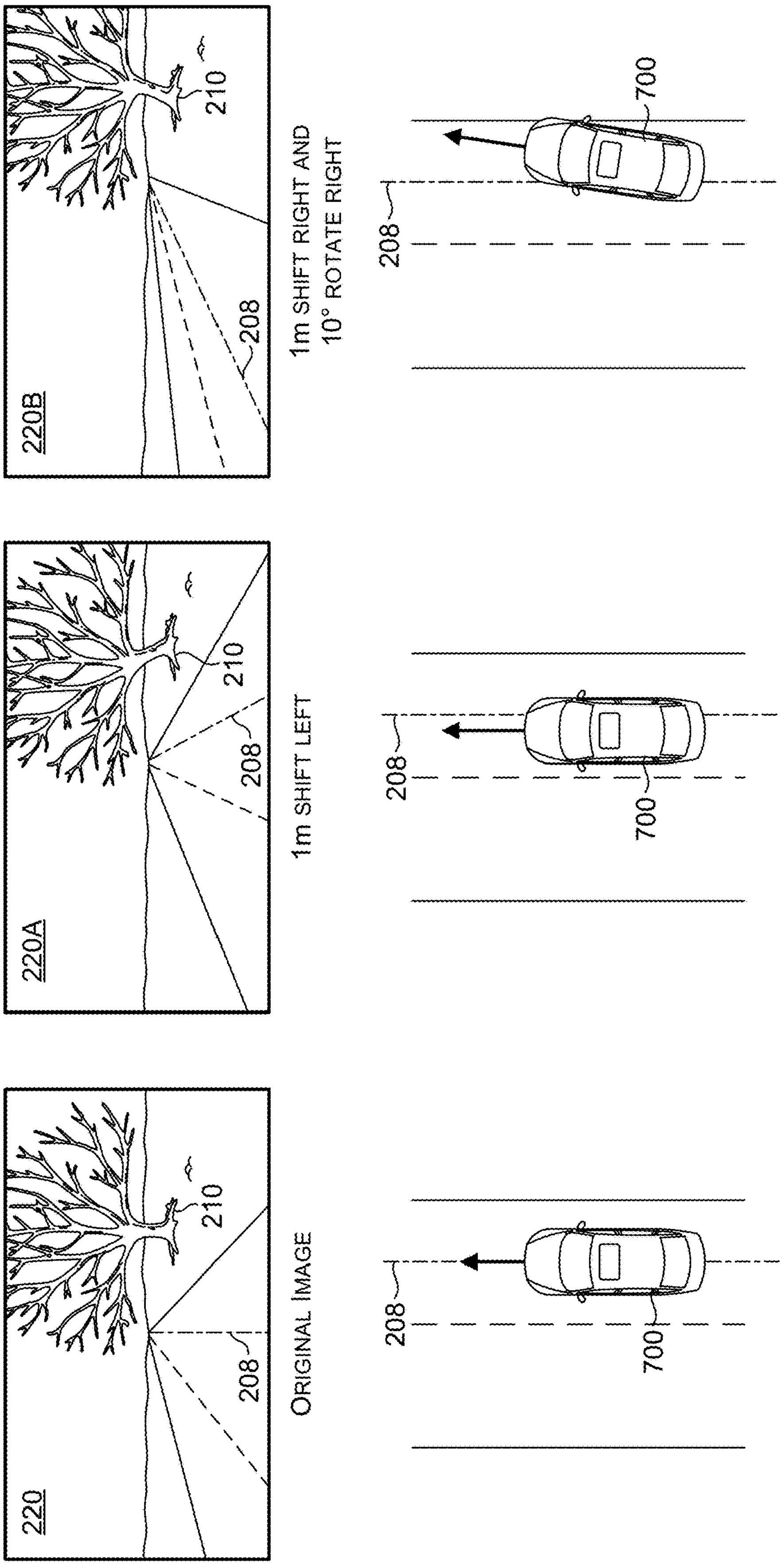
FIG. 2 illustrates examples of image data transformed to generate synthetic image data, in accordance with some embodiments of the present disclosure.

Referring now to FIG. 2, FIG. 2 illustrates examples of image data transformed to generate synthetic image data, in accordance with some embodiments of the present disclosure. In particular, FIG. 2 shows image 220, which may correspond to the input data 120, and images 220A and 220B, which may correspond to synthetic image data generated by the data augmenter 104 from the image 220. For example, the data augmenter 104 may generate the image 220A from the image 220 at least in part by applying a viewpoint transform(s) which virtually shifts the viewpoint of a camera that captured the image 220 to the left by 1 meter. Similarly, the data augmenter 104 may generate the image 220B from the image 220 at least in part by applying a viewpoint transform(s) which virtually shifts the viewpoint of a camera that captured the image 220 to the right by 1 meter and virtually rotates the viewpoint of the camera by 10 degrees to the right.

The approach to data augmentation described with respect to FIG. 2 may be useful to account for potential challenges a system may face if the MLM 118 were trained and deployed without using data augmentation techniques. For example, the MLM 118 may be trained using imitation learning and limitations in the training data could result in a driving system that uses the MLM 118 encountering a series of network errors, controller errors, or environmental factors that would cause the vehicle to deviate from lane center 208. For example, if the MLM 118 were trained only with samples where the vehicle 700 is aligned with the target trajectory, the network may have challenges predicting the correct trajectory if the vehicle deviates from the lane center 208 because off-road-center driving is outside of the original training data. To mitigate this issue, the approach of FIG. 2 may be used to make the vehicle appear to be shifted from the lane center 208 and/or rotated from the lane direction to emulate a shift and rotation of the camera.

However, in order for the data augmenter 104 to apply the viewpoint transform(s) optimally, highly accurate 3D geometric information about the world may be required, which may be difficult or impractical to obtain in some scenarios involving the real-world. As such, distortion artifacts may appear, such as is indicated in FIG. 2. For example, one or more of the viewpoint transforms may assume a flat-world in accounting for the 3D geometry of the world and artifacts may result to these and/or other assumptions or heuristics. FIG. 2 indicates that vertical features whose base is below the horizon in the image may be distorted, such as features of a tree 210 alongside the road.

Because these artifacts carry information about the shift and rotation of the augmentation, it is possible that these artifacts could become a dominant signal that the MLM 118 uses to learn the training labels and/or other outputs rather than using the image of the road. In particular, the artifacts may be correlated with the ground truth information so that an MLM may learn to make predictions based at least in part on the artifacts. However, the artifacts may not be present when the MLM 118 is deployed, which may result in degraded performance of the MLM and less accurate predictions.

Aspects of the present disclosure may provide for measuring and/or detecting an MLM(s) reliance on artifacts and/or whether the MLM is relying on artifacts to make predictions (e.g., using the testing results evaluator 112), in networks that rely on transformed input data, but also more generally to any scenario where an MLM is trained to make predictions using input data, whether or not there are any artifacts in the input data. For example, disclosed approaches may be used to evaluate MLM reliance on artifacts which may appear in real-world data or synthetic or simulated input data as out-of-domain content or artifacts. An example of out-of-domain content or artifacts is content corresponding to headlights or steering wheel positions rather than perimeter lines of the road and lane markings when the MLM is being trained to learn to follow the road. For example, real-world or simulated images used to train an MLM may include a reflection of a steering wheel on the windshield or headlights that the MLM can use at least in part to predict how to follow the road. However, during deployment these features may not be present or may not always be present or otherwise similar correlations found in the training data may not exit in input data during deployment (e.g., where a human was controlling the steering wheel for the training data, but the vehicle is not controlled by a human). Similarly, some bug, heuristic, or other inaccuracy in a simulation may produce artifacts correlated with ground truth in simulated input data.

In accordance with aspects of the disclosure, the data set selector 106 may select multiple testing data sets, such as the testing data sets 124A and 124B for testing the MLM 118 such that differences in performance, if any, of the MLM 118 between the sets may indicate whether and/or an extent by which the MLM 118 is trained to rely on artifacts. Thus, the testing results evaluator 112 may detect whether and/or an extent by which the MLM 118 is trained to rely on artifacts using results of the testing.

The data set selector 106 may select the training data set 122 used by the MLM trainer 108 to train the MLM 118 and the MLM trainer 108 may train the MLM 118 using any suitable approach. As a non-limiting example, the MLM trainer 108 may use, from the input data provided using the input data pipeline 140, image data representative of one or more images (or other data representations) and load the data into memory in the form of a multi-dimensional array/matrix (alternatively referred to as tensor, or more specifically an input tensor, in some examples). The array size may be computed and/or represented as W×H×C, where W stands for the image width in pixels, H stands for the height in pixels, and C stands for the number of color channels. Without loss of generality, other types and orderings of input image components are also possible. Additionally, the batch size B may be used as a dimension (e.g., an additional fourth dimension) when batching is used. Batching may be used for training and/or for inference. Thus, the input tensor may represent an array of dimension W×H×C×B. Any ordering of the dimensions may be possible, which may depend on the particular hardware and software used to implement the sensor data pre-processor. This ordering may be chosen to maximize training and/or inference performance of the MLM(s) 118.

The MLM(s) 118 may use as input one or more images or other data representations or instances (e.g., LIDAR data, RADAR data, SONAR data, ultrasound data, etc.) to generate output(s). In a non-limiting example, the MLM(s) 118 may take as input an image(s) represented by the input data (e.g., after pre-processing to predict trajectory data, the vehicle orientation, and/or a vehicle state). Although examples are described herein with respect to using neural networks, and specifically convolutional neural networks, as the MLM(s) 118, this is not intended to be limiting. For example, and without limitation, the MLM(s) 118 described herein may include one or more of any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

The MLM tester 110 may use any number of the testing data sets selected by the data set selector 106, such as the testing data set 124A and the testing data set 124B to test performance of the MLM 118 using any suitable approach. The testing may be performed after and/or during training of the MLM 118 (e.g., after the MLM 118 is fully trained to converge using back propagation or another approach or otherwise reaches a state determined to be fully trained with respect to a given training data set 122). The testing may generate results for each testing data set and any suitable performance metric may be computed to capture the performance of the MLM 118 on a corresponding testing data set.

Examples of performance metrics include or are based at least on those that capture one or more of classification metrics (e.g., accuracy, precision, recall, F1-score, receiver operating characteristic, area under the curve, etc.), regression metrics (e.g., mean squared error, mean absolute error), ranking metrics (e.g., mean reciprocal rank, discounted cumulative gain, normalized discounted cumulative gain), statistical metrics (e.g., correlation), computer vision metrics (e.g., peak signal to noise ratio, structural simulate index measure, intersection over union), e.g., natural language processing metrics (e.g., perplexity, bilingual evaluation understudy score), and/or deep learning related metrics (e.g., inception score, Frechet inception distance).

In at least one embodiment, in order for the differences in performance, if any, of the MLM 118 between the sets to indicate whether and/or an extent by which the MLM 118 is trained to rely on artifacts, the MLM 118 may be trained using the training data set(s) 122 generated using a first value of a parameter that defines at least one value of at least one characteristic of the training input data. If the training data set 122 includes artifacts, the parameter may define or influence the correlation between artifacts in the training input data and corresponding ground truth data used to train the MLM 118.

In the example of FIG. 2, the one or more parameters may define or influence the correlation between the distortions to the vertical features whose base is below the horizon and the corresponding lane center 208 in an image. By way of example and not limitation, such parameter(s) may define one or more aspects of the perspective of a real or virtual camera and/or other sensors used to capture the image 220, which is transformed to augment the input data (e.g., location, orientation, and/or pose with respect to the vehicle and/or other reference point, such as the ground, camera intrinsics, lens distortion, field of view, focal length, etc.). For example, if the training data set 122 were captured using a camera at a location relative to the vehicle, the correlation used to predict the center line learned by the MLM 118 may be relative to that location, but would change if the camera were at a different location.

The testing data set 124A and 124B may be selected to correspond to different respective classes of testing data, in which values of the parameter(s) are configured to shift at least one value of the characteristic (e.g., camera location) in different directions for each class. For testing, the testing data set 124A may be selected by the data set selector 106 and/or generated based at least on the input data 120 used for the testing data set 124A corresponding to a second value of the parameter that shifts the at least one value in a first direction. In the example of FIG. 2, if the training data set 122 were generated using a camera at a location relative to the vehicle (e.g., a characteristic defined by the one or more parameters), the testing data set 124A may be captured using a camera (the same or a different camera) at a location relative to the vehicle that is shifted in a first direction with respect to the location used to generate the training data set 122. In the present example, as the one or more parameters of the camera define or influence the correlation between the distortions to the vertical features whose base is below the horizon and the corresponding lane center in an image, moving the camera may impact the performance of the MLM 118 on the testing data set 124A. For example, shifting the perspective of the camera to the left may result in one or more corresponding predictions of the center line of the road made by the MLM 118 being shifted left. Thus, the testing results evaluator 112 may use the performance of the MLM 118 to determine whether the MLM 118 is relying on the artifacts to make predictions and/or whether the parameter(s) impact any artifacts correlated with the ground truth.

In one or more embodiments, the testing data set 124B may use the value of the parameter(s) used to generate the training data set 122 (without shifting the at least one value of at least one characteristic of the training input data in a direction). However, while the differences in performance of the MLM 118 in the testing between the testing data sets 124A and 124B may indicate whether and an extent by which the MLM 118 is trained to rely on artifacts, it may not be sufficient to make such determinations definitively. For example, the MLM 118 may merely be poorly trained and biased towards in a direction corresponding to one of the training data sets.

Thus, in one or more embodiments, the testing data set 124B may be selected by the data set selector 106 and/or generated based at least on the input data 120 used for the testing data set 124A corresponding to a third value of the parameter that shifts the at least one value in a second direction (e.g., opposite the first direction). In the example of FIG. 2, the testing data set 124B may be captured using a camera (the same or a different camera) at a location relative to the vehicle that is shifted in a second direction with respect to the location used to generate the training data set 122. For example, the first direction for the testing data set 124A may be left and shifting the perspective of the camera to the right for the testing data set 124B may result in one or more corresponding predictions of the center line of the road made by the MLM 118 being shifted right.

Shifting the value(s) for the testing data sets 124A and 124B in multiple directions (e.g., left and right), can help distinguish between a poorly trained network and a network relying on artifacts. For example potential bias in a direction can be accounted for by evaluating how the MLM 118 performs in multiple directions (e.g., the combination of poor left and right performance may indicate a reliance on artifacts), and statistically significant differences in performance between the two may indicate bias.

Various approaches may be used to generate the input data used in the testing data sets 124A, 124B, and/or other testing data sets selected by the data set selector 106. In the example of capturing data using one or more sensors of a vehicle, data can be collected by driving the same route multiple times, with each time using a corresponding value(s) of a parameter(s) to shift at least one value of a characteristic. Continuing with the example of FIG. 2, to generate input data for the testing data set 124A, data may be generated by a human driving close to the left edge of the lane, effectively shifting sensor positions relative to ground truth locations in one direction. To generate input data for the testing data set 124B, data may be generated by a human driving close to the right edge of the lane, effectively shifting sensor positions relative to ground truth locations in another direction. If the network is not affected by artifacts, it would be expected that the MLM 118 will still identify the center of the road.

In addition to or instead of capturing the data for the testing data sets at different times, at least some of the data may be captured concurrently. For example, sensors, such as cameras may be located at different positions on the vehicle reflecting corresponding values of parameters being shifted. Thus, a camera may be located left of center (or otherwise left of a camera location used for the training data set) to capture left-biased data for the testing data set 124A and another camera may be located right of center (or otherwise right of the camera location used for the training data set) to capture right-biased data for the testing data set 124B. The road may then be driven to concurrently capture the data for each testing data set. In at least one embodiment, another camera(s) or sensor(s) may be used to concurrently capture the data for the training data set 122.

In one or more embodiments, input data for each of the testing data sets and/or training data sets may be generated such that they include the same correlation, if any, between artifacts and corresponding ground truth data. In particular, each data set may include the same artifacts. This may be accomplished, for example, by providing the input data using the same input data pipeline 140. Where the artifacts are caused, at least in part, by data augmentation, the same algorithms may be used to augment the input data for each data set. Where the artifacts are caused, at least in part, by simulation, the same simulator configuration may be used to generate the input data for each data set.

In at least one embodiment, a resimulator may be used to generate data for at least some of the training and/or testing data sets and/or to test the MLM 118. For example, the resimulator may include at least some of the functionality of the data augmenter 104 and/or the MLM tester 110. The resimulator may be used to account for real-world tests being time consuming, not easily reproduced, and risky or unsafe. In at least one embodiment, the resimulator may allow for closed loop testing like in a synthetic simulator but working off real sensor recordings instead of synthetic data. In disclosed examples the resimulator may use viewpoint transforms to expand the training data to domains not recorded through human driving.

The resimulator may use an approach analogous to video-replay, except the system under test may be free to control the car as if operating in a synthetic simulation. At each new state of simulation, sensor data may be produced for the cameras through a viewpoint transform from the closest frame in the recording. As long as the system under test does not deviate too much from the recorded path, sensor data can always be available. If the network deviates too much from the recorded path, then there may not be sufficient sensor information available to apply transformations; therefore in these instances the simulated vehicle may be reset to the center of the road.

The same strategy may be leveraged to generate testing environments from collected videos or images. The resimulator may provide simulated data without the need to design simulated cities and roads (e.g., in a photorealistic simulation produced from rendering 3D graphics) while reproducing the same or similar scenarios of real-world failures useful for simulation.

However, as the testing and training data may both be generated using the same simulation techniques, they may include the same artifacts, presenting challenges to detecting reliance of the MLM 118 on artifacts, since they may also be leveraged in both training and testing for predictions. Disclosed approaches may be used to account for such difficulties in detecting reliance of the MLM 118 on artifacts, but may also be leveraged in scenarios that do not include these complications.

In one or more embodiments, the testing results evaluator 112 may determine that the MLM 118 is trained to rely, at least in part, on artifacts for predictions based at least on there being a difference between the performance of the MLM 118 on the testing data sets 124A and 124B. For example, reliance may be determined where a difference in performance is greater than a threshold value. In one or more embodiments, the threshold value may be computed (e.g., based on the quantity of samples in the data sets) or otherwise set such that exceeding the threshold indicates a statistically significant reliance on artifacts.

In one or more embodiments, the testing results evaluator 112 may compute a measure of an extent by which the MLM 118 is trained to rely, at least in part, on artifacts for predictions based at least on evaluating the difference between the performance of the MLM 118 on the testing data sets 124A and 124B. For example, one or more performance metrics used to compute the measure (which may also be referred to as a reliance metric or score) may quantify, for at least one given testing data set 124A or 124B (or particular sample thereof) a distance(s) between predictions and ground truth (e.g., any suitable measure of how far a predicted value is from ground truth). The amount of reliance captured by the reliance metric may then correspond to the magnitude of the distance(s).

To illustrate an example of a performance metric with the example of FIG. 2, performance score $Y_L$ may be computed using a performance metric that quantifies a lateral offset (e.g., in meters, which may be determined in world space) from the center of the lane (e.g., ground truth) for the testing data set 124A, which is left-biased (in relation to the camera location used for training) in this example. Reducing the lateral offset may reduce the reliance metric and increasing the lateral offset may increase the reliance metric. Similarly, performance score $Y_R$ may be computed using the performance metric for the testing data set 124B, which is right-biased in this example.

In at least one embodiment, the reliance metric may be computed (or reliance on artifacts may otherwise be determined) based at least on an absolute deviation in performance of the MLM 118 between the testing using the testing data sets 124A and 124B. For example, the reliance metric may be computed using a median absolute deviation (MAD) between performance scores.

By way of example, Equation (1) may be used to compute a reliance score R using a MAD:

$$R = 1/2\left(\left|(Y_L - Y_{average})/Y_{HL} + (Y_R - Y_{average})/Y_{HR}\right|\right) \times 100, \quad (1)$$

where $Y_{average}$ may refer to an average of performance scores $Y_L$ and $Y_R$ and 100 may be used to form a percentage. Left offset $Y_{HL}$ and right offset $Y_{HR}$ may be used to compensate for the effect of human bias in the data sets, which may not be present in all embodiments. To illustrate further, the present example may be based on imitation learning and a human driver may not always drive perfectly centered in a lane. Left offset $Y_{HL}$ and right offset $Y_{HR}$ may be used to compensate for this bias. For each of these parameters, a left deviation from center (or other reference value(s) from the ground truth) may have a positive value and a right deviation from center may have a negative value.

As an example, suppose $Y_L$=0.5, $Y_R$–0.5, $Y_{HL}$=1, and $Y_{HR}$=–1. Then, $Y_{average}$=0. In this case, the reliance score R=½(|(0.5–0)/1+(–0.5–0)/–1)×100%=½(0.5+0.5)×100%=50%.

In at least one embodiment, a reliance metric is computed per frame, time step, and/or sample or pair of samples. For example, the reliance metric R may be computed for correlated samples across the testing data sets. In the example of FIG. 2, left-biased and right-biased samples may be correlated (e.g., as left-right pairs). The samples may be correlated across data set, by way of example and not limitation, based at least in part on a temporal, spatial (e.g., in a world or virtual coordinate system), and/or other relationship between the samples. In the example where each training data set corresponds to the same route, a left-right pair may include samples at the same or substantially same location along the route (e.g., based on having the same or correlated time-stamps, frame number, etc.). For example, performance score YI, and left offset $Y_{HL}$ may correspond to a single sample from the testing data set 124A and performance score $Y_R$ and right offset $Y_{HR}$ may correspond to a single sample from the testing data set 124B.

In at least one embodiment, a reliance metric is computed for multiple frames, time steps, and/or samples or pairs of samples. For example, performance score YI, and left offset $Y_{HL}$ may comprise an average or other statistical value computed from multiple samples from the testing data set 124A and performance score $Y_R$ and right offset $Y_{HR}$ may comprise an average or other statistical value computed from multiple samples from the testing data set 124B. In at least one embodiment, a reliance metric may be computed per frame, time step, and/or sample or pair of samples, and an average or other statistical value may be computed from the reliance scores.

Disclosed embodiments may be used to compute a reliance metric, such as the reliance metric R, that corresponds to a formula using the mean values of bias. In example embodiments, the reliance metric may be configured such that computed scores are 0 or 0% based at least on the MLM 118 not being affected by artifacts (zero affinity). Further, the reliance metric may be configured such that computed scores are 1 or 100% if the MLM 118 has a maximum reliance on artifacts (full affinity according to the metric, such as where the MLM 118 predicts center lines exactly like the human). In some embodiments, it is possible for a score to be above 100%, such as where the bias is greater than that of the human or other reference point. In other embodiments, 1 or 100% may represent a maximal possible bias. Also, the reliance metric may be configured such that computed scores are unaffected by network bias, so if the MLM 118 tracks too far to the left but is unaffected by human driving it may still report 0%. Thus, a reliance score of 0% may not mean the MLM 118 predicts the center of the road or even comes close.

While examples of the reliance score are provided for two testing data sets, any number of testing data sets may be used, where each may correspond to a different value of the parameter(s).

The evaluation data 126 may represent, at least in part, results of any number of determinations and/or computations performed using the testing results evaluator 112. Examples include reliance scores, indicia of reliance on artifacts, indicia of lack of reliance on artifacts, and/or other data which the MLM analysis system 100 may associate with one or more corresponding samples or sample pairs. The evaluation data 126 may be used to perform a variety of computer operations. In at least one embodiment, the MLM analysis system 100 may use the evaluation data 126 to display data indicating the results of the determinations and/or computations performed using the testing results evaluator. For example, the data may indicate the difference in performance of the MLM 118, such as one or more reliance indicators and/or a reliance score, and may be presented on a client device (e.g., that may or may not include one or more components of the MLM analysis system 100 shown in FIG. 1).

Figure 3:
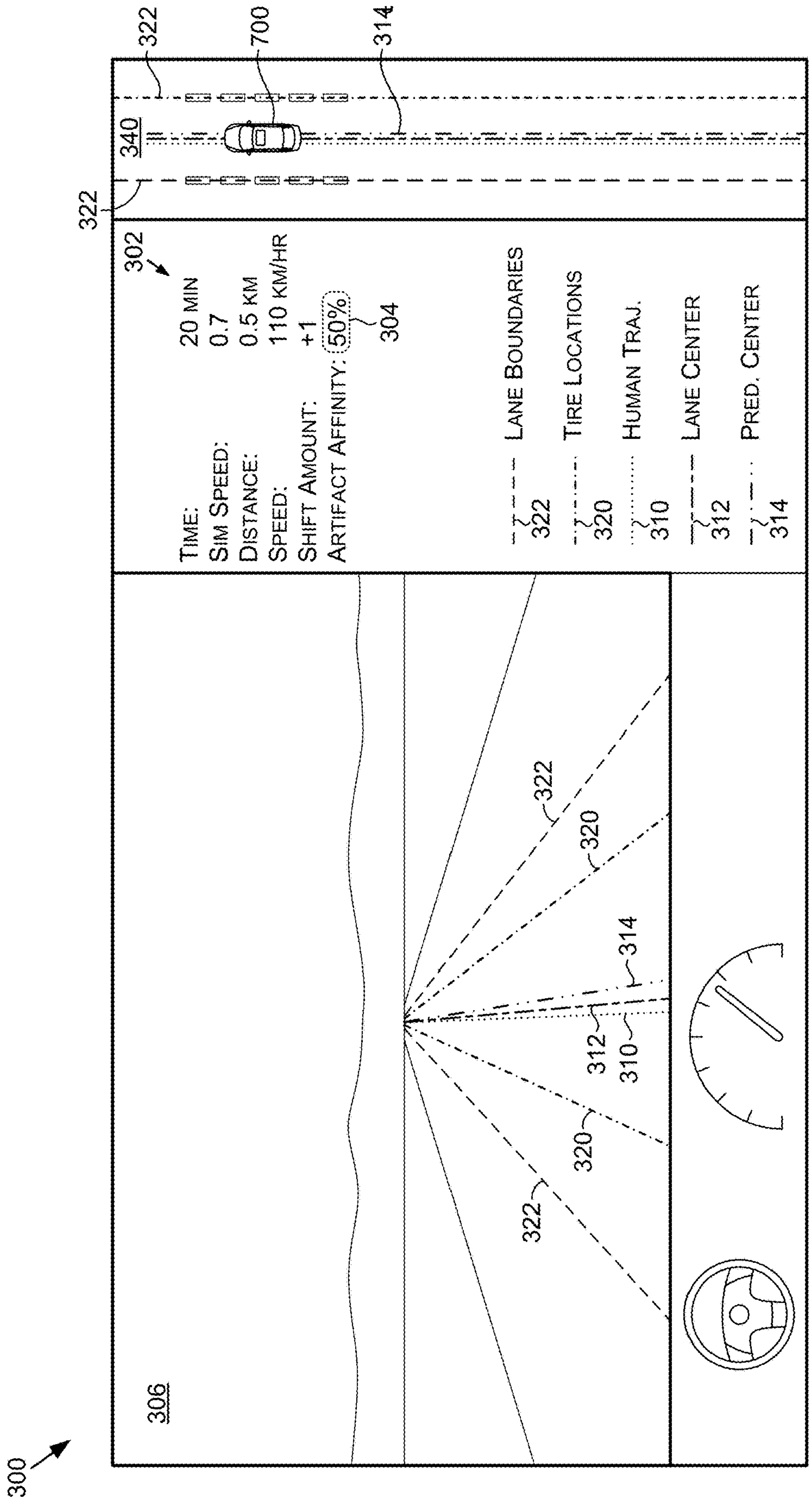
FIG. 3 illustrates an example of a display of data indicating results of evaluating differences in performance between testing data sets, in accordance with some embodiments of the present disclosure.

Referring now to FIG. 3, FIG. 3 illustrates an example of a display 300 of data indicating results of evaluating differences in performance between testing data sets, in accordance with some embodiments of the present disclosure. The display 300 may correspond to a user interface that presents a view of other representation of one or more samples from the training data set 122, the testing data set 124A, and/or the testing data set 124B, along other corresponding information which may include a presentation 302 of metadata, at least some of which may correspond to the evaluation data 126. For example, the presentation 302 includes a presentation 304 indicating a reliance score corresponding to a depiction 306 of one or more correlated samples. In at least one embodiment, the presentation 302 may be updated to correspond to the depiction 306 in a display region of the interface as the depiction 306 is changed to correspond to one or more other correlated samples (e.g., using video playback and/or frame or time-based user selection). In other examples, the presentation 304 may be without a corresponding depiction and/or may be displayed using graphs, charts, and/or other forms of presentation.

By way of example, the depiction 306 includes an indicator 310 of a human trajectory, an indicator 312 of ground truth lane center, and an indicator 314 of a predicted lane center or predicted trajectory made using the MLM 118 (e.g., overlaid on an image representing one or more corresponding samples). The depiction 306 also includes indicators 320 of vehicle tire locations and indicators 322 of lane boundaries. A depiction 340 provides another example of how one or more of such indicators may be presented using a top down view corresponding to the one or more correlated samples.

Additionally or alternatively, the computer operations may include deploying and/or further testing the MLM 118 using real-world input data, for example, based at least on a reliance score and/or aggregation thereof exceeding a threshold value (e.g., indicating low or no reliance on artifacts). Based at least on a reliance score and/or aggregation thereof failing to exceed a threshold value (e.g., indicating high reliance on artifacts), the computer operations may include using a different training method to train the MLM 118 and/or modifying one or more portions of the MLM 118 (e.g., by replacing one or more portions of the head of the network and performing further training with data that does not include the artifacts). In at least one embodiment, a different MLM may be trained and tested based on the evaluation data 126. In at least one embodiment, at least some new training input data, testing input data, and/or ground truth data may be generated and used for testing and/or training the same, different, and/or modified MLM based at least on the evaluation data 126 (e.g., using the same or a different or modified input data pipeline 140).

In at least one embodiment, at least some of the same training input data, testing input data, and/or ground truth data may be generated and used for testing and/or training the same, different, and/or modified MLM based at least on the evaluation data 126. In any suitable example, one or more of the computer operations may be performed by the MLM analysis system 100 based on or in response to user interaction and/or without such user interaction. Further, one or more of the computer operations may be performed by or using the same application, service and/or user interface or different applications, services, and/or user interfaces (which may correspond to the same software or different software used to implement any of the various functionality of the MLM analysis system 100 described herein).

In at least one embodiment, to improve reliance scores for MLMs trained with human trajectories as ground truth and optimized to get a high mean distance between failures the computer operations may include, in resimulation, using a different way to train MLMs using human-created labels of the lane centers as ground truth. For example, the inherent random departures from the lane centers by the human data collection drivers may result in a randomization of the artifacts, which can be leveraged to improve reliance scores. One or more embodiments may include a process for performing viewpoint transforms to correct for artifacts from different camera placements. To be sure the transforms are working correctly and without or with minimal artifacts, embodiments of the present disclosure may include a tool capable of moving a camera from one known position to another and then apply the transform for images taken at each position. One image can be subtracted from the other creating a difference image. The transform can be verified as functioning properly when the difference image has pixel values near zero.

Figure 4:
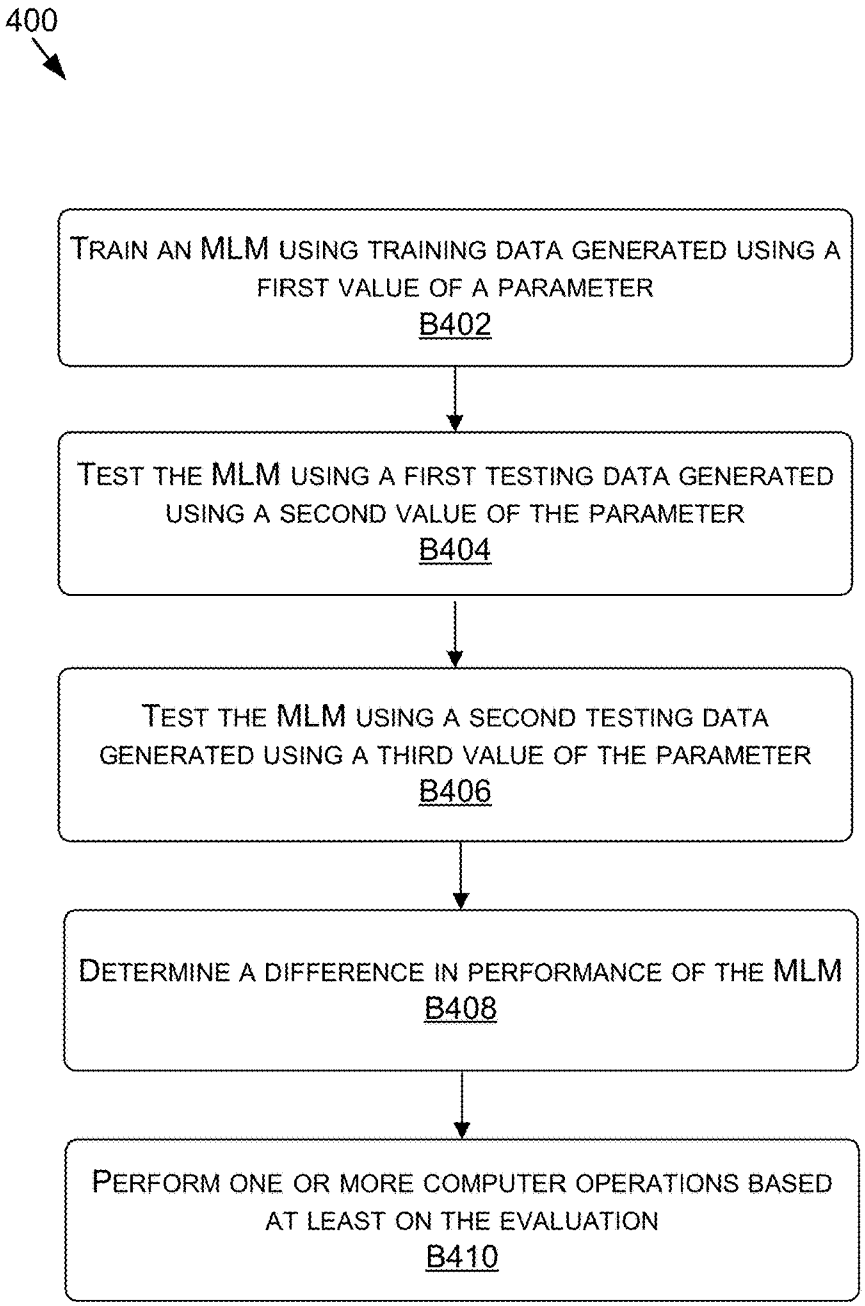
FIG. 4 is a flow diagram showing a method for determining a difference in performance indicating whether an MLM relies on one or more artifacts to make predictions, in accordance with some embodiments of the present disclosure.

Now referring to FIG. 4, each block of method 400, and other methods described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, method 400 is described, by way of example, with respect to the MLM analysis system 100 of FIG. 1. However, these methods may additionally or alternatively be executed by any one system, or any combination of systems, including, but not limited to, those described herein.

FIG. 4 is a flow diagram showing a method 400 for determining a difference in performance indicating whether an MLM relies on one or more artifacts to make predictions, in accordance with some embodiments of the present disclosure. The method 400, at block B402, includes training an MLM using training data generated using a first value of a parameter. For example, the MLM trainer 108 may train the MLM 118 using training input data corresponding to the training data set 122 generated using a first value of a parameter that defines at least one value associated with at least one characteristic of the training input data.

The method 400, at block B404, includes testing the MLM using first testing data generated using a second value of the parameter. For example, the MLM tester 110 may test the MLM 118 using first testing input data corresponding to the testing data set 124A generated using a second value of the parameter that shifts the at least one value in a first direction.

The method 400, at block B406, includes testing the MLM using second testing data generated using a third value of the parameter. For example, the MLM tester 110 may test the MLM 118 using first testing input data corresponding to the testing data set 124B generated using a third value of the parameter that shifts the at least one value in a second direction.

The method 400, at block B408, includes determining a difference in performance of the MLM. For example, the testing results evaluator 112 may determine a difference in performance of the MLM 118 between the testing the MLM 118 using the first testing data and the testing the MLM 118 using the second testing data. The difference in performance may indicate whether the MLM 118 is trained to rely on one or more artifacts to make predictions.

The method 400, at block B410, includes performing one or more computer operations based at least on the determination. For example, the evaluation data 126 may be used to perform one or more computer operations.

Figure 5:
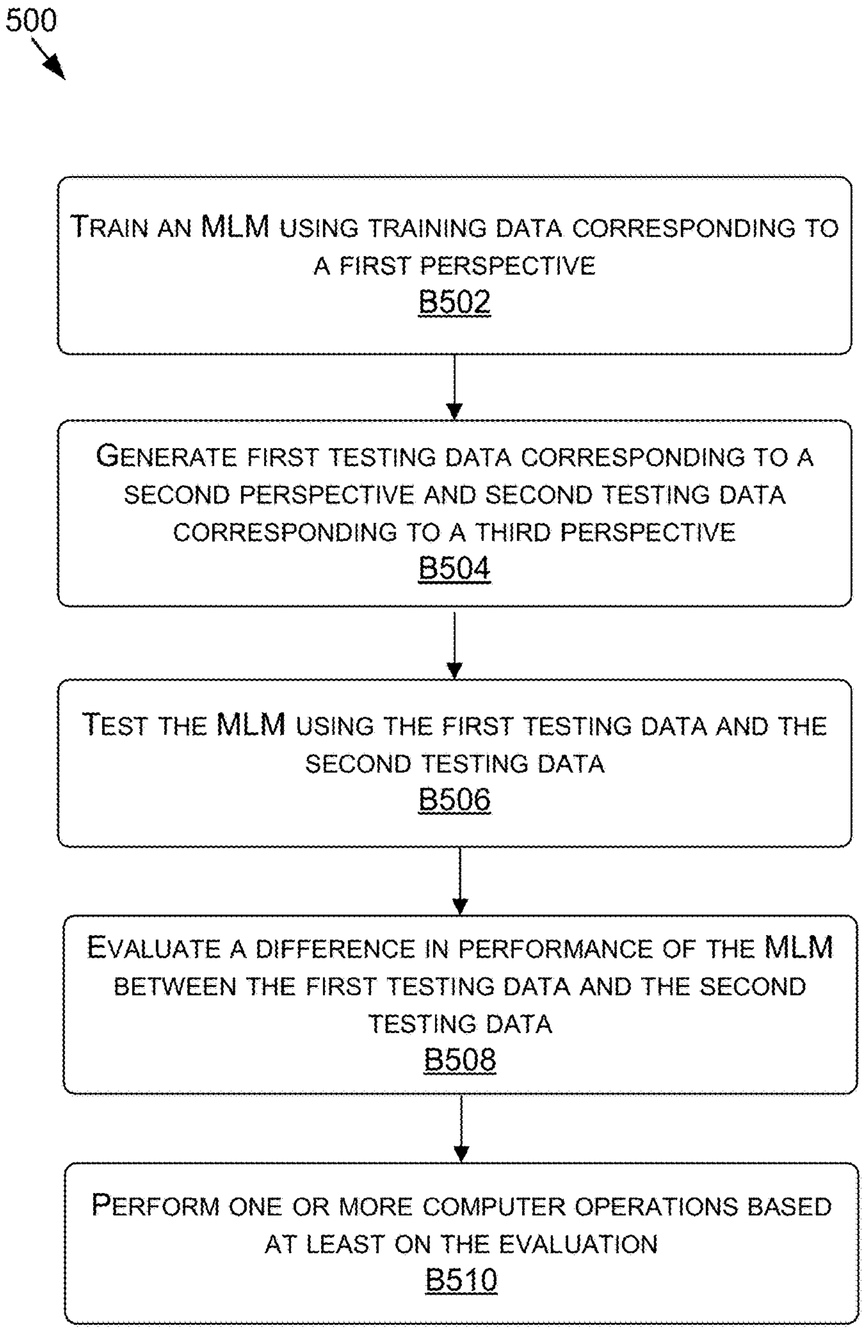
FIG. 5 is a flow diagram showing a method for generating testing data and using the testing data to evaluate a difference in performance that indicates whether an MLM relies on one or more artifacts to make predictions, in accordance with some embodiments of the present disclosure.

Now referring to FIG. 5, FIG. 5 is a flow diagram showing a method 500 for generating testing data and using the testing data to evaluate a difference in performance that indicates whether an MLM relies on one or more artifacts to make predictions. The method 500, at block B502, includes training a neural network using training input data corresponding to a first perspective. For example, the MLM trainer 108 may train the MLM 118 using training input data corresponding to the training data set 122.

The method 500, at block B502, includes generating first testing data corresponding to a second perspective and second testing data corresponding to a third perspective. For example, the input data pipeline 140 may be used to generate first testing data corresponding to the testing data set 124A and a second perspective, the second perspective defined by at least one value of at least one parameter offset from the first perspective in a first direction. The input data pipeline 140 may also be used to generate second testing data corresponding to the testing data set 124B and a third perspective, the third perspective defined by the at least one value of the at least one parameter offset from the first perspective in a second direction.

The method 500, at block B506, includes testing the MLM using the first testing data and the second testing data. For example, the MLM tester 110 may test the MLM 118 using the testing data sets 124A and 124B.

The method 500, at block B508, includes evaluating a difference in performance of the MLM between the first testing data and the second testing data. For example, the testing results evaluator 112 may evaluate a difference in performance of the MLM 118 in the testing between the testing data set 124A and the testing data set 124B. The difference in performance may indicate whether the MLM 118 is trained to rely on one or more artifacts to make predictions.

The method 500, at block B510, includes performing one or more computer operations based at least on the evaluation. For example, the evaluation data 126 may be used to perform one or more computer operations.

Figure 6:
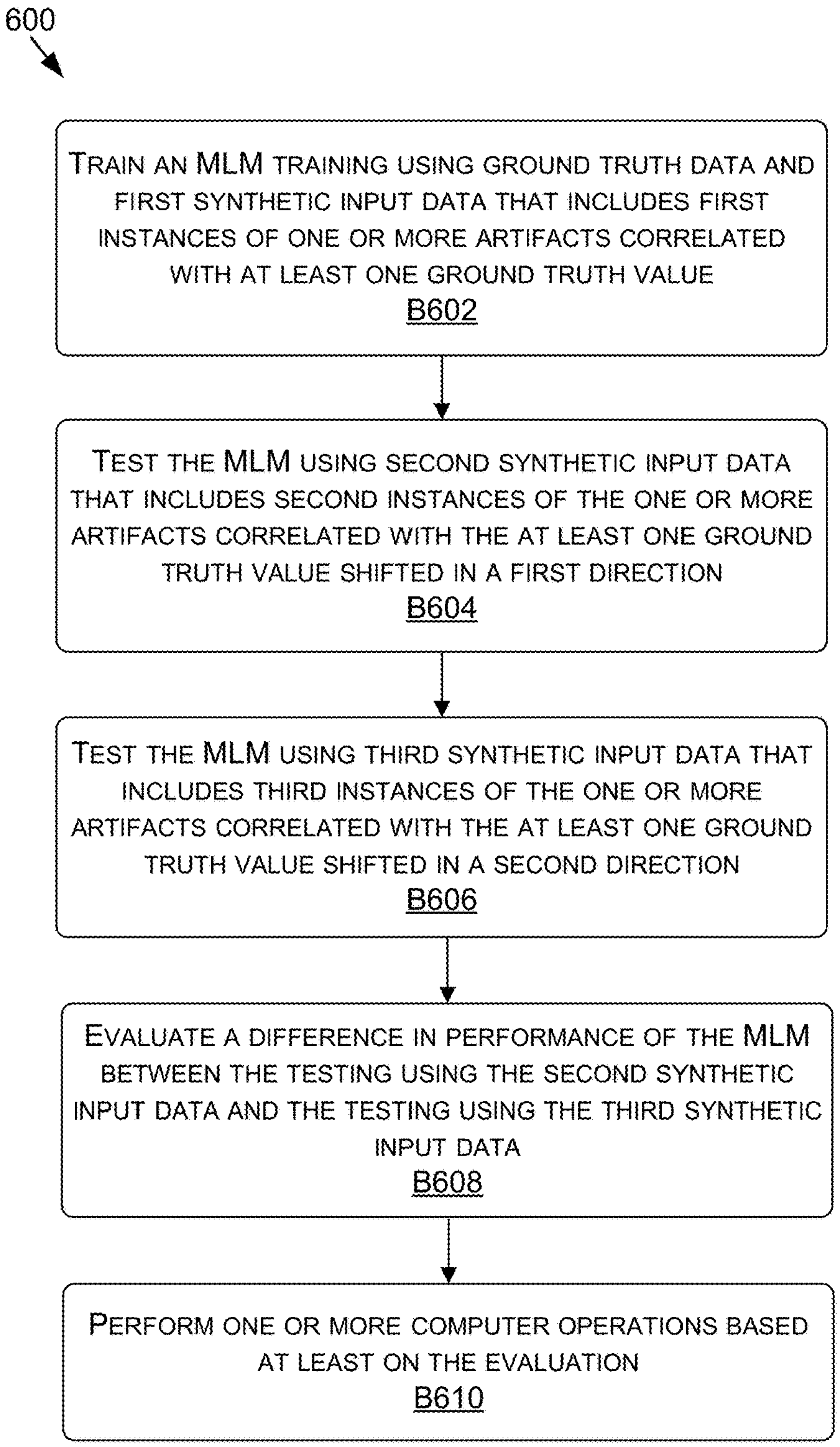
FIG. 6 is a flow diagram showing a method for evaluating whether an MLM trained using training input data that includes one or more artifacts correlated with ground truth data relies on the correlation for predictions, in accordance with some embodiments of the present disclosure.

Now referring to FIG. 6, FIG. 6 is a flow diagram showing a method 600 for evaluating whether an MLM trained using training input data that includes one or more artifacts correlated with ground truth data relies on the correlation for predictions, in accordance with some embodiments of the present disclosure. The method 600, at block B602, includes training an MLM training using ground truth data and first synthetic input data that includes first instances of one or more artifacts correlated with at least one ground truth value. For example, the MLM trainer 108 may train the MLM 118 using the training data set 122.

The method 600, at block B604, includes testing the MLM using second synthetic input data that includes second instances of the one or more artifacts correlated with the at least one ground truth value shifted in a first direction. For example, the MLM tester 110 may test the MLM 118 using the testing data set 124A.

The method 600, at block B606, includes testing the MLM using third synthetic input data that includes third instances of the one or more artifacts correlated with the at least one ground truth value shifted in a second direction. For example, the MLM tester 110 may test the MLM 118 using the testing data set 124B.

The method 600, at block B608, includes evaluating a difference in performance of the MLM between the testing using the second synthetic input data and the testing using the third synthetic input data. For example, the testing results evaluator 112 may evaluate a difference in performance of the MLM between the testing using the second synthetic input data and the testing using the third synthetic input data.

The method 600, at block B610, includes performing one or more computer operations based at least on the evaluation. For example, the evaluation data 126 may be used to perform one or more computer operations.

Example Autonomous Vehicle

Figure 7A:
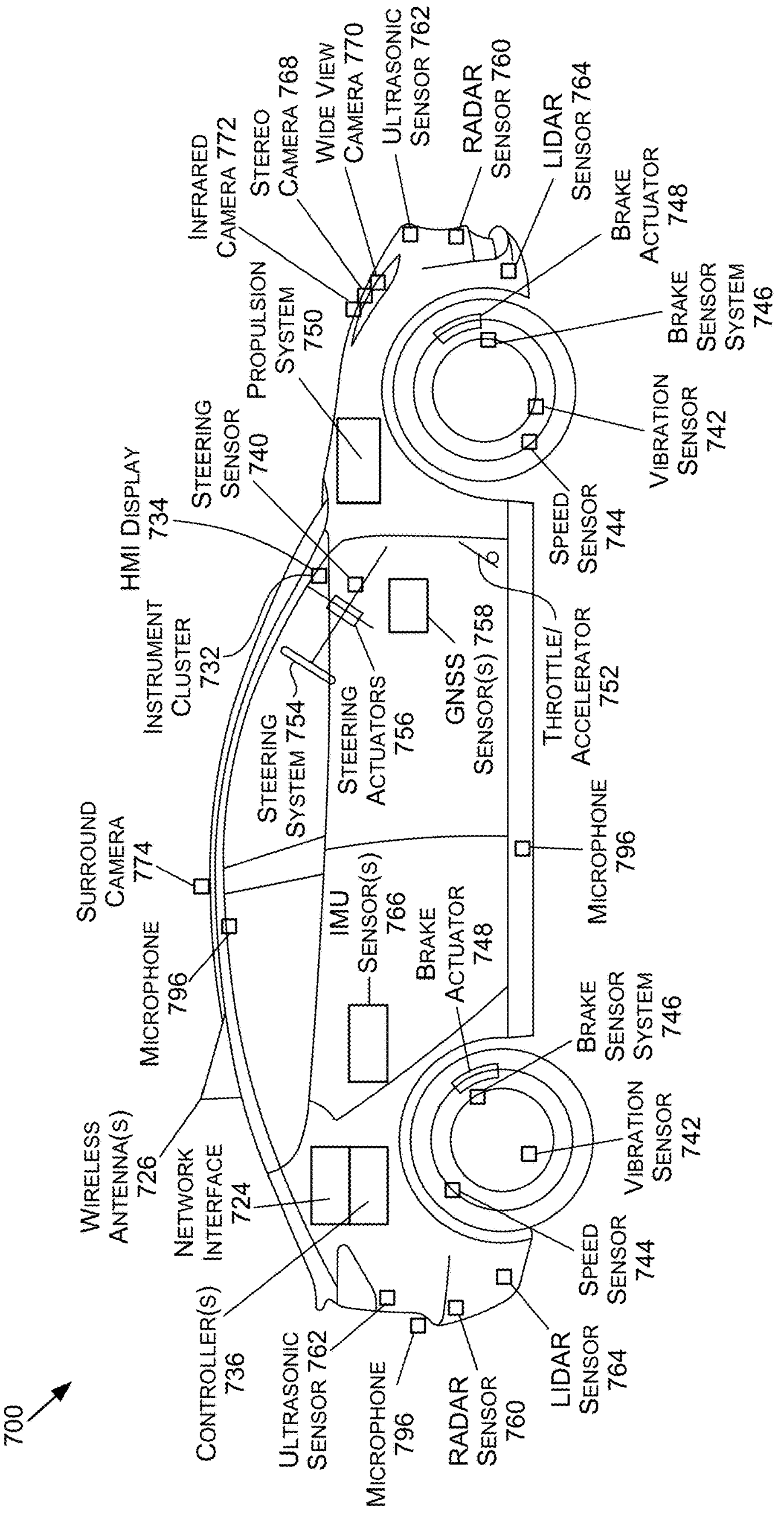
FIG. 7A is an illustration of an example autonomous vehicle, in accordance with some embodiments of the present disclosure.

FIG. 7A is an illustration of an example autonomous vehicle 700, in accordance with some embodiments of the present disclosure. The autonomous vehicle 700 (alternatively referred to herein as the "vehicle 700") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, a vehicle coupled to a trailer, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 700 may be capable of functionality in accordance with one or more of Level 3-Level 5 of the autonomous driving levels. The vehicle 700 may be capable of functionality in accordance with one or more of Level 1-Level 5 of the autonomous driving levels. For example, the vehicle 700 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 700 or other machine, such as being fully autonomous, being highly autonomous, being conditionally autonomous, being partially autonomous, providing assistive autonomy, being semi-autonomous, being primarily autonomous, or other designation.

The vehicle 700 may include components such as a chassis, a vehicle body, wheels (e.g., 2, 4, 6, 8, 18, etc.), tires, axles, and other components of a vehicle. The vehicle 700 may include a propulsion system 750, such as an internal combustion engine, hybrid electric power plant, an all-electric engine, and/or another propulsion system type. The propulsion system 750 may be connected to a drive train of the vehicle 700, which may include a transmission, to enable the propulsion of the vehicle 700. The propulsion system 750 may be controlled in response to receiving signals from the throttle/accelerator 752.

A steering system 754, which may include a steering wheel, may be used to steer the vehicle 700 (e.g., along a desired path or route) when the propulsion system 750 is operating (e.g., when the vehicle is in motion). The steering system 754 may receive signals from a steering actuator 756. The steering wheel may be optional for full automation (Level 5) functionality.

The brake sensor system 746 may be used to operate the vehicle brakes in response to receiving signals from the brake actuators 748 and/or brake sensors.

Controller(s) 736, which may include one or more system on chips (SoCs) 704 (FIG. 7C) and/or GPU(s), may provide signals (e.g., representative of commands) to one or more components and/or systems of the vehicle 700. For example, the controller(s) may send signals to operate the vehicle brakes via one or more brake actuators 748, to operate the steering system 754 via one or more steering actuators 756, to operate the propulsion system 750 via one or more throttle/accelerators 752. The controller(s) 736 may include one or more onboard (e.g., integrated) computing devices (e.g., supercomputers) that process sensor signals, and output operation commands (e.g., signals representing commands) to enable autonomous driving and/or to assist a human driver in driving the vehicle 700. The controller(s) 736 may include a first controller 736 for autonomous driving functions, a second controller 736 for functional safety functions, a third controller 736 for artificial intelligence functionality (e.g., computer vision), a fourth controller 736 for infotainment functionality, a fifth controller 736 for redundancy in emergency conditions, and/or other controllers. In some examples, a single controller 736 may handle two or more of the above functionalities, two or more controllers 736 may handle a single functionality, and/or any combination thereof.

The controller(s) 736 may provide the signals for controlling one or more components and/or systems of the vehicle 700 in response to sensor data received from one or more sensors (e.g., sensor inputs). The sensor data may be received from, for example and without limitation, global navigation satellite systems sensor(s) 758 (e.g., Global Positioning System sensor(s)), RADAR sensor(s) 760, ultrasonic sensor(s) 762, LIDAR sensor(s) 764, inertial measurement unit (IMU) sensor(s) 766 (e.g., accelerometer(s), gyroscope(s), magnetic compass(es), magnetometer(s), etc.), microphone(s) 796, stereo camera(s) 768, wide-view camera(s) 770 (e.g., fisheye cameras), infrared camera(s) 772, surround camera(s) 774 (e.g., 360 degree cameras), long-range and/or mid-range camera(s) 798, speed sensor(s) 744 (e.g., for measuring the speed of the vehicle 700), vibration sensor(s) 742, steering sensor(s) 740, brake sensor(s) (e.g., as part of the brake sensor system 746), and/or other sensor types.

One or more of the controller(s) 736 may receive inputs (e.g., represented by input data) from an instrument cluster 732 of the vehicle 700 and provide outputs (e.g., represented by output data, display data, etc.) via a human-machine interface (HMI) display 734, an audible annunciator, a loudspeaker, and/or via other components of the vehicle 700. The outputs may include information such as vehicle velocity, speed, time, map data (e.g., the HD map 722 of FIG. 7C), location data (e.g., the vehicle's 700 location, such as on a map), direction, location of other vehicles (e.g., an occupancy grid), information about objects and status of objects as perceived by the controller(s) 736, etc. For example, the HMI display 734 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 700 further includes a network interface 724 which may use one or more wireless antenna(s) 726 and/or modem(s) to communicate over one or more networks. For example, the network interface 724 may be capable of communication over LTE, WCDMA, UMTS, GSM, CDMA2000, etc. The wireless antenna(s) 726 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 7B:
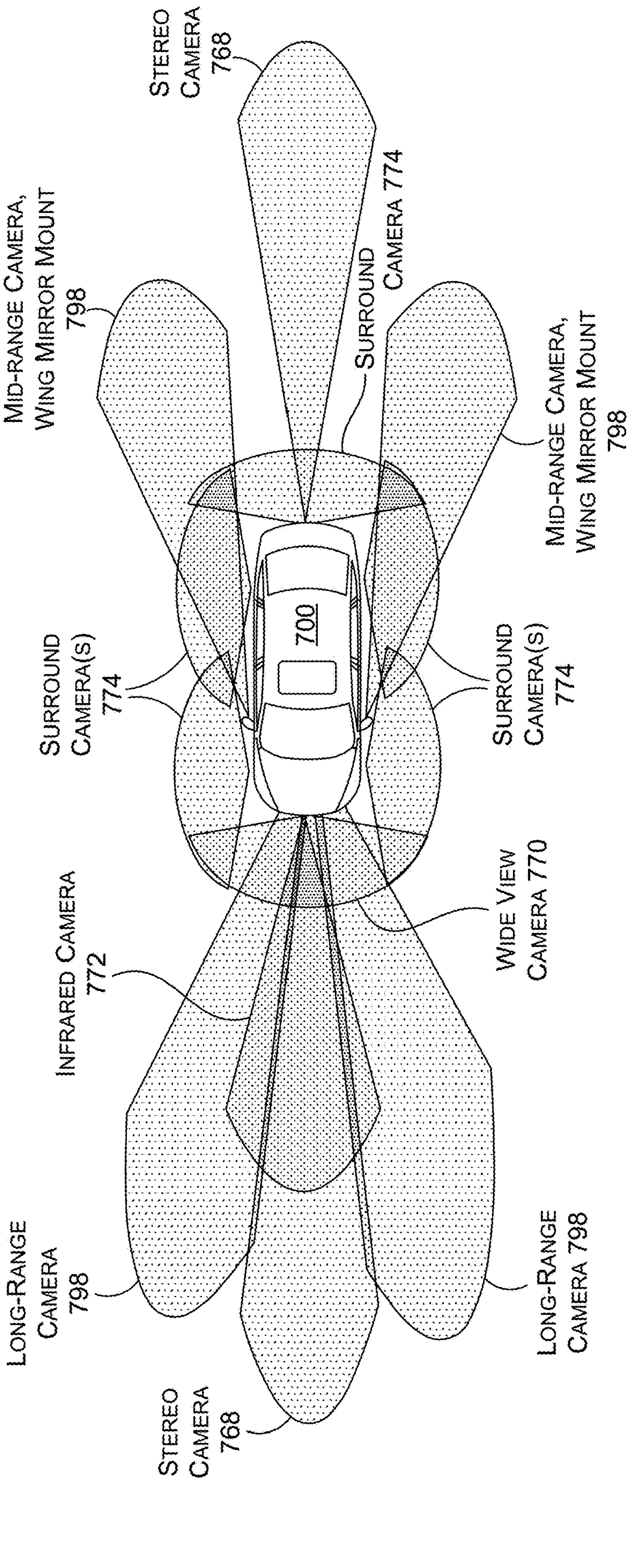
FIG. 7B is an example of camera locations and fields of view for the example autonomous vehicle of FIG. 7A, in accordance with some embodiments of the present disclosure.

FIG. 7B is an example of camera locations and fields of view for the example autonomous vehicle 700 of FIG. 7A, in accordance with some embodiments of the present disclosure. The cameras and respective fields of view are one example embodiment and are not intended to be limiting. For example, additional and/or alternative cameras may be included and/or the cameras may be located at different locations on the vehicle 700.

The camera types for the cameras may include, but are not limited to, digital cameras that may be adapted for use with the components and/or systems of the vehicle 700. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 700 (e.g., front-facing cameras) may be used for surround view, to help identify forward facing paths and obstacles, as well aid in, with the help of one or more controllers 736 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 770 that may be used to perceive objects coming into view from the periphery (e.g., pedestrians, crossing traffic or bicycles). Although only one wide-view camera is illustrated in FIG. 7B, there may any number of wide-view cameras 770 on the vehicle 700. In addition, long-range camera(s) 798 (e.g., a long-view stereo camera pair) may be used for depth-based object detection, especially for objects for which a neural network has not yet been trained. The long-range camera(s) 798 may also be used for object detection and classification, as well as basic object tracking.

One or more stereo cameras 768 may also be included in a front-facing configuration. The stereo camera(s) 768 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 768 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 768 may be used in addition to, or alternatively from, those described herein.

Cameras with a field of view that include portions of the environment to the side of the vehicle 700 (e.g., side-view cameras) may be used for surround view, providing information used to create and update the occupancy grid, as well as to generate side impact collision warnings. For example, surround camera(s) 774 (e.g., four surround cameras 774 as illustrated in FIG. 7B) may be positioned to on the vehicle 700. The surround camera(s) 774 may include wide-view camera(s) 770, fisheye camera(s), 360 degree camera(s), and/or the like. Four example, four fisheye cameras may be positioned on the vehicle's front, rear, and sides. In an alternative arrangement, the vehicle may use three surround camera(s) 774 (e.g., left, right, and rear), and may leverage one or more other camera(s) (e.g., a forward-facing camera) as a fourth surround view camera.

Cameras with a field of view that include portions of the environment to the rear of the vehicle 700 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 798, stereo camera(s) 768), infrared camera(s) 772, etc.), as described herein.

Figure 7C:
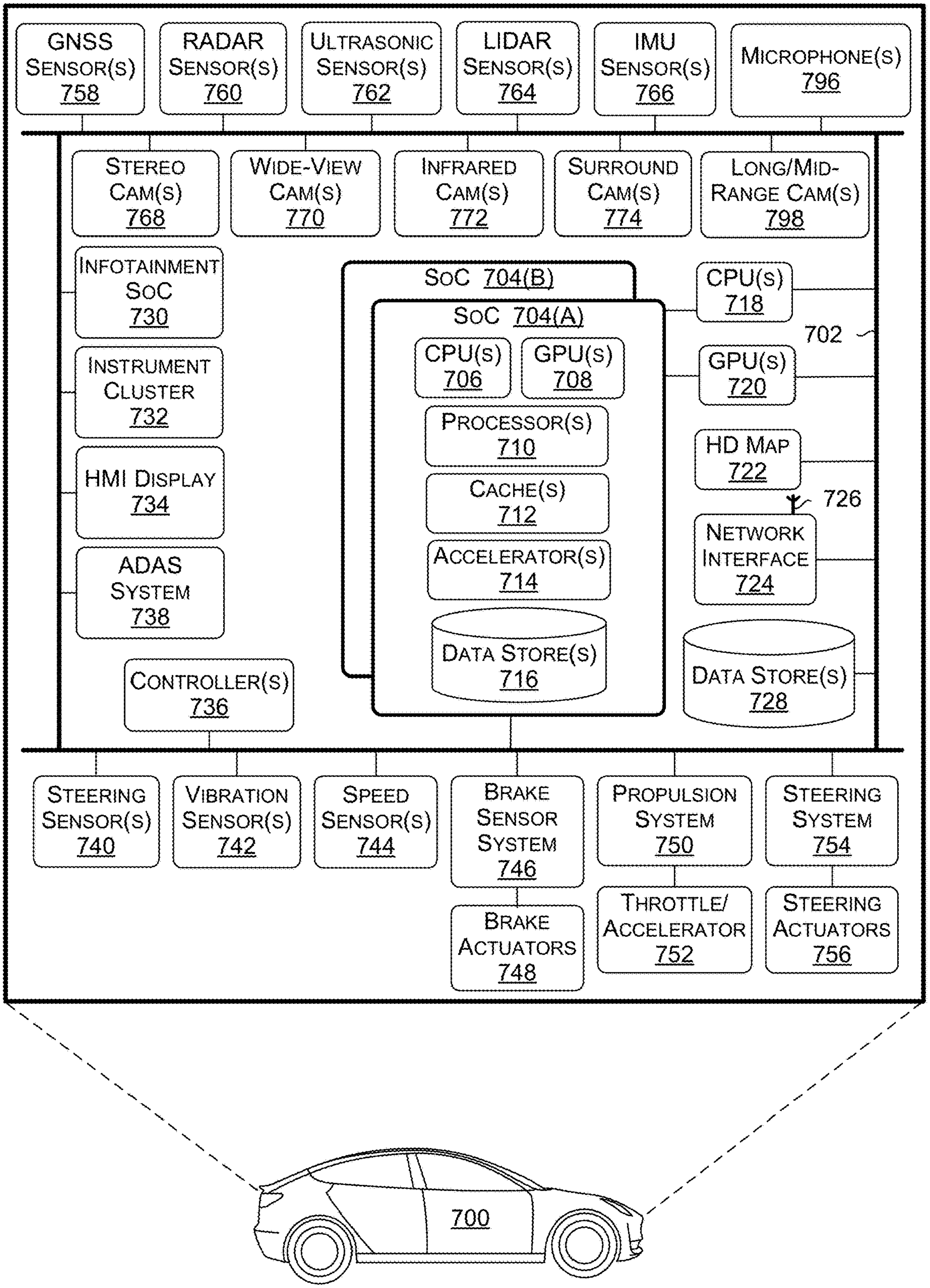
FIG. 7C is a block diagram of an example system architecture for the example autonomous vehicle of FIG. 7A, in accordance with some embodiments of the present disclosure.

FIG. 7C is a block diagram of an example system architecture for the example autonomous vehicle 700 of FIG. 7A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 700 in FIG. 7C are illustrated as being connected via bus 702. The bus 702 may include a Controller Area Network (CAN) data interface (alternatively referred to herein as a "CAN bus"). A CAN may be a network inside the vehicle 700 used to aid in control of various features and functionality of the vehicle 700, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 702 is described herein as being a CAN bus, this is not intended to be limiting. For example, in addition to, or alternatively from, the CAN bus, FlexRay and/or Ethernet may be used. Additionally, although a single line is used to represent the bus 702, this is not intended to be limiting. For example, there may be any number of busses 702, which may include one or more CAN busses, one or more FlexRay busses, one or more Ethernet busses, and/or one or more other types of busses using a different protocol. In some examples, two or more busses 702 may be used to perform different functions, and/or may be used for redundancy. For example, a first bus 702 may be used for collision avoidance functionality and a second bus 702 may be used for actuation control. In any example, each bus 702 may communicate with any of the components of the vehicle 700, and two or more busses 702 may communicate with the same components. In some examples, each SoC 704, each controller 736, and/or each computer within the vehicle may have access to the same input data (e.g., inputs from sensors of the vehicle 700), and may be connected to a common bus, such the CAN bus.

The vehicle 700 may include one or more controller(s) 736, such as those described herein with respect to FIG. 7A. The controller(s) 736 may be used for a variety of functions. The controller(s) 736 may be coupled to any of the various other components and systems of the vehicle 700, and may be used for control of the vehicle 700, artificial intelligence of the vehicle 700, infotainment for the vehicle 700, and/or the like.

The vehicle 700 may include a system(s) on a chip (SoC) 704. The SoC 704 may include CPU(s) 706, GPU(s) 708, processor(s) 710, cache(s) 712, accelerator(s) 714, data store(s) 716, and/or other components and features not illustrated. The SoC(s) 704 may be used to control the vehicle 700 in a variety of platforms and systems. For example, the SoC(s) 704 may be combined in a system (e.g., the system of the vehicle 700) with an HD map 722 which may obtain map refreshes and/or updates via a network interface 724 from one or more servers (e.g., server(s) 778 of FIG. 7D).

The CPU(s) 706 may include a CPU cluster or CPU complex (alternatively referred to herein as a "CCPLEX"). The CPU(s) 706 may include multiple cores and/or L2 caches. For example, in some embodiments, the CPU(s) 706 may include eight cores in a coherent multi-processor configuration. In some embodiments, the CPU(s) 706 may include four dual-core clusters where each cluster has a dedicated L2 cache (e.g., a 2 MB L2 cache). The CPU(s) 706 (e.g., the CCPLEX) may be configured to support simultaneous cluster operation enabling any combination of the clusters of the CPU(s) 706 to be active at any given time.

The CPU(s) 706 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 706 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 708 may include an integrated GPU (alternatively referred to herein as an "iGPU"). The GPU(s) 708 may be programmable and may be efficient for parallel workloads. The GPU(s) 708, in some examples, may use an enhanced tensor instruction set. The GPU(s) 708 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 708 may include at least eight streaming microprocessors. The GPU(s) 708 may use compute application programming interface(s) (API(s)). In addition, the GPU(s) 708 may use one or more parallel computing platforms and/or programming models (e.g., NVIDIA's CUDA).

The GPU(s) 708 may be power-optimized for best performance in automotive and embedded use cases. For example, the GPU(s) 708 may be fabricated on a Fin field-effect transistor (FinFET). However, this is not intended to be limiting and the GPU(s) 708 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 708 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 708 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 708 to access the CPU(s) 706 page tables directly. In such examples, when the GPU(s) 708 memory management unit (MMU) experiences a miss, an address translation request may be transmitted to the CPU(s) 706. In response, the CPU(s) 706 may look in its page tables for the virtual-to-physical mapping for the address and transmits the translation back to the GPU(s) 708. As such, unified memory technology may allow a single unified virtual address space for memory of both the CPU(s) 706 and the GPU(s) 708, thereby simplifying the GPU(s) 708 programming and porting of applications to the GPU(s) 708.

In addition, the GPU(s) 708 may include an access counter that may keep track of the frequency of access of the GPU(s) 708 to memory of other processors. The access counter may help ensure that memory pages are moved to the physical memory of the processor that is accessing the pages most frequently.

The SoC(s) 704 may include any number of cache(s) 712, including those described herein. For example, the cache(s) 712 may include an L3 cache that is available to both the CPU(s) 706 and the GPU(s) 708 (e.g., that is connected both the CPU(s) 706 and the GPU(s) 708). The cache(s) 712 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 704 may include an arithmetic logic unit(s) (ALU(s)) which may be leveraged in performing processing with respect to any of the variety of tasks or operations of the vehicle 700—such as processing DNNs. In addition, the SoC(s) 704 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 706 and/or GPU(s) 708.

The SoC(s) 704 may include one or more accelerators 714 (e.g., hardware accelerators, software accelerators, or a combination thereof). For example, the SoC(s) 704 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 708 and to off-load some of the tasks of the GPU(s) 708 (e.g., to free up more cycles of the GPU(s) 708 for performing other tasks). As an example, the accelerator(s) 714 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 714 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 708, and by using an inference accelerator, for example, a designer may target either the DLA(s) or the GPU(s) 708 for any function. For example, the designer may focus processing of CNNs and floating point operations on the DLA(s) and leave other functions to the GPU(s) 708 and/or other accelerator(s) 714.

The accelerator(s) 714 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 706. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 714 (e.g., the hardware acceleration cluster) may include a computer vision network on-chip and SRAM, for providing a high-bandwidth, low latency SRAM for the accelerator(s) 714. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 704 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 714 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 766 output that correlates with the vehicle 700 orientation, distance, 3D location estimates of the object obtained from the neural network and/or other sensors (e.g., LIDAR sensor(s) 764 or RADAR sensor(s) 760), among others.

The SoC(s) 704 may include data store(s) 716 (e.g., memory). The data store(s) 716 may be on-chip memory of the SoC(s) 704, which may store neural networks to be executed on the GPU and/or the DLA. In some examples, the data store(s) 716 may be large enough in capacity to store multiple instances of neural networks for redundancy and safety. The data store(s) 712 may comprise L2 or L3 cache(s) 712. Reference to the data store(s) 716 may include reference to the memory associated with the PVA, DLA, and/or other accelerator(s) 714, as described herein.

The SoC(s) 704 may include one or more processor(s) 710 (e.g., embedded processors). The processor(s) 710 may include a boot and power management processor that may be a dedicated processor and subsystem to handle boot power and management functions and related security enforcement. The boot and power management processor may be a part of the SoC(s) 704 boot sequence and may provide runtime power management services. The boot power and management processor may provide clock and voltage programming, assistance in system low power state transitions, management of SoC(s) 704 thermals and temperature sensors, and/or management of the SoC(s) 704 power states. Each temperature sensor may be implemented as a ring-oscillator whose output frequency is proportional to temperature, and the SoC(s) 704 may use the ring-oscillators to detect temperatures of the CPU(s) 706, GPU(s) 708, and/or accelerator(s) 714. If temperatures are determined to exceed a threshold, the boot and power management processor may enter a temperature fault routine and put the SoC(s) 704 into a lower power state and/or put the vehicle 700 into a chauffeur to safe stop mode (e.g., bring the vehicle 700 to a safe stop).

The processor(s) 710 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 710 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 710 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 710 may further include a real-time camera engine that may include a dedicated processor subsystem for handling real-time camera management.

The processor(s) 710 may further include a high-dynamic range signal processor that may include an image signal processor that is a hardware engine that is part of the camera processing pipeline.

The processor(s) 710 may include a video image compositor that may be a processing block (e.g., implemented on a microprocessor) that implements video post-processing functions needed by a video playback application to produce the final image for the player window. The video image compositor may perform lens distortion correction on wide-view camera(s) 770, surround camera(s) 774, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 708 is not required to continuously render new surfaces. Even when the GPU(s) 708 is powered on and active doing 3D rendering, the video image compositor may be used to offload the GPU(s) 708 to improve performance and responsiveness.

The SoC(s) 704 may further include a mobile industry processor interface (MIPI) camera serial interface for receiving video and input from cameras, a high-speed interface, and/or a video input block that may be used for camera and related pixel input functions. The SoC(s) 704 may further include an input/output controller(s) that may be controlled by software and may be used for receiving I/O signals that are uncommitted to a specific role.

The SoC(s) 704 may further include a broad range of peripheral interfaces to enable communication with peripherals, audio codecs, power management, and/or other devices. The SoC(s) 704 may be used to process data from cameras (e.g., connected over Gigabit Multimedia Serial Link and Ethernet), sensors (e.g., LIDAR sensor(s) 764, RADAR sensor(s) 760, etc. that may be connected over Ethernet), data from bus 702 (e.g., speed of vehicle 700, steering wheel position, etc.), data from GNSS sensor(s) 758 (e.g., connected over Ethernet or CAN bus). The SoC(s) 704 may further include dedicated high-performance mass storage controllers that may include their own DMA engines, and that may be used to free the CPU(s) 706 from routine data management tasks.

The SoC(s) 704 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 704 may be faster, more reliable, and even more energy-efficient and space-efficient than conventional systems. For example, the accelerator(s) 714, when combined with the CPU(s) 706, the GPU(s) 708, and the data store(s) 716, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 720) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 708.

In some examples, a CNN for facial recognition and vehicle owner identification may use data from camera sensors to identify the presence of an authorized driver and/or owner of the vehicle 700. The always on sensor processing engine may be used to unlock the vehicle when the owner approaches the driver door and turn on the lights, and, in security mode, to disable the vehicle when the owner leaves the vehicle. In this way, the SoC(s) 704 provide for security against theft and/or carjacking.

In another example, a CNN for emergency vehicle detection and identification may use data from microphones 796 to detect and identify emergency vehicle sirens. In contrast to conventional systems, that use general classifiers to detect sirens and manually extract features, the SoC(s) 704 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 758. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 762, until the emergency vehicle(s) passes.

The vehicle may include a CPU(s) 718 (e.g., discrete CPU(s), or dCPU(s)), that may be coupled to the SoC(s) 704 via a high-speed interconnect (e.g., PCIe). The CPU(s) 718 may include an X86 processor, for example. The CPU(s) 718 may be used to perform any of a variety of functions, including arbitrating potentially inconsistent results between ADAS sensors and the SoC(s) 704, and/or monitoring the status and health of the controller(s) 736 and/or infotainment SoC 730, for example.

The vehicle 700 may include a GPU(s) 720 (e.g., discrete GPU(s), or dGPU(s)), that may be coupled to the SoC(s) 704 via a high-speed interconnect (e.g., NVIDIA's NVLINK).

The GPU(s) 720 may provide additional artificial intelligence functionality, such as by executing redundant and/or different neural networks, and may be used to train and/or update neural networks based on input (e.g., sensor data) from sensors of the vehicle 700.

The vehicle 700 may further include the network interface 724 which may include one or more wireless antennas 726 (e.g., one or more wireless antennas for different communication protocols, such as a cellular antenna, a Bluetooth antenna, etc.). The network interface 724 may be used to enable wireless connectivity over the Internet with the cloud (e.g., with the server(s) 778 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 700 information about vehicles in proximity to the vehicle 700 (e.g., vehicles in front of, on the side of, and/or behind the vehicle 700). This functionality may be part of a cooperative adaptive cruise control functionality of the vehicle 700.

The network interface 724 may include a SoC that provides modulation and demodulation functionality and enables the controller(s) 736 to communicate over wireless networks. The network interface 724 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 700 may further include data store(s) 728 which may include off-chip (e.g., off the SoC(s) 704) storage. The data store(s) 728 may include one or more storage elements including RAM, SRAM, DRAM, VRAM, Flash, hard disks, and/or other components and/or devices that may store at least one bit of data.

The vehicle 700 may further include GNSS sensor(s) 758. The GNSS sensor(s) 758 (e.g., GPS, assisted GPS sensors, differential GPS (DGPS) sensors, etc.), to assist in mapping, perception, occupancy grid generation, and/or path planning functions. Any number of GNSS sensor(s) 758 may be used, including, for example and without limitation, a GPS using a USB connector with an Ethernet to Serial (RS-232) bridge.

The vehicle 700 may further include RADAR sensor(s) 760. The RADAR sensor(s) 760 may be used by the vehicle 700 for long-range vehicle detection, even in darkness and/or severe weather conditions. RADAR functional safety levels may be ASIL B. The RADAR sensor(s) 760 may use the CAN and/or the bus 702 (e.g., to transmit data generated by the RADAR sensor(s) 760) for control and to access object tracking data, with access to Ethernet to access raw data in some examples. A wide variety of RADAR sensor types may be used. For example, and without limitation, the RADAR sensor(s) 760 may be suitable for front, rear, and side RADAR use. In some example, Pulse Doppler RADAR sensor(s) are used.

The RADAR sensor(s) 760 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 760 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 700 surroundings at higher speeds with minimal interference from traffic in adjacent lanes. The other two antennae may expand the field of view, making it possible to quickly detect vehicles entering or leaving the vehicle's 700 lane.

Mid-range RADAR systems may include, as an example, a range of up to 760 m (front) or 80 m (rear), and a field of view of up to 42 degrees (front) or 750 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 700 may further include ultrasonic sensor(s) 762. The ultrasonic sensor(s) 762, which may be positioned at the front, back, and/or the sides of the vehicle 700, may be used for park assist and/or to create and update an occupancy grid. A wide variety of ultrasonic sensor(s) 762 may be used, and different ultrasonic sensor(s) 762 may be used for different ranges of detection (e.g., 2.5 m, 4 m). The ultrasonic sensor(s) 762 may operate at functional safety levels of ASIL B.

The vehicle 700 may include LIDAR sensor(s) 764. The LIDAR sensor(s) 764 may be used for object and pedestrian detection, emergency braking, collision avoidance, and/or other functions. The LIDAR sensor(s) 764 may be functional safety level ASIL B. In some examples, the vehicle 700 may include multiple LIDAR sensors 764 (e.g., two, four, six, etc.) that may use Ethernet (e.g., to provide data to a Gigabit Ethernet switch).

In some examples, the LIDAR sensor(s) 764 may be capable of providing a list of objects and their distances for a 360-degree field of view. Commercially available LIDAR sensor(s) 764 may have an advertised range of approximately 700 m, with an accuracy of 2 cm-3 cm, and with support for a 700 Mbps Ethernet connection, for example. In some examples, one or more non-protruding LIDAR sensors 764 may be used. In such examples, the LIDAR sensor(s) 764 may be implemented as a small device that may be embedded into the front, rear, sides, and/or corners of the vehicle 700. The LIDAR sensor(s) 764, in such examples, may provide up to a 120-degree horizontal and 35-degree vertical field-of-view, with a 200 m range even for low-reflectivity objects. Front-mounted LIDAR sensor(s) 764 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 700. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 764 may be less susceptible to motion blur, vibration, and/or shock.

The vehicle may further include IMU sensor(s) 766. The IMU sensor(s) 766 may be located at a center of the rear axle of the vehicle 700, in some examples. The IMU sensor(s) 766 may include, for example and without limitation, an accelerometer(s), a magnetometer(s), a gyroscope(s), a magnetic compass(es), and/or other sensor types. In some examples, such as in six-axis applications, the IMU sensor(s) 766 may include accelerometers and gyroscopes, while in nine-axis applications, the IMU sensor(s) 766 may include accelerometers, gyroscopes, and magnetometers.

In some embodiments, the IMU sensor(s) 766 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 766 may enable the vehicle 700 to estimate heading without requiring input from a magnetic sensor by directly observing and correlating the changes in velocity from GPS to the IMU sensor(s) 766. In some examples, the IMU sensor(s) 766 and the GNSS sensor(s) 758 may be combined in a single integrated unit.

The vehicle may include microphone(s) 796 placed in and/or around the vehicle 700. The microphone(s) 796 may be used for emergency vehicle detection and identification, among other things.

The vehicle may further include any number of camera types, including stereo camera(s) 768, wide-view camera(s) 770, infrared camera(s) 772, surround camera(s) 774, long-range and/or mid-range camera(s) 798, and/or other camera types. The cameras may be used to capture image data around an entire periphery of the vehicle 700. The types of cameras used depends on the embodiments and requirements for the vehicle 700, and any combination of camera types may be used to provide the necessary coverage around the vehicle 700. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 7A and FIG. 7B.

The vehicle 700 may further include vibration sensor(s) 742. The vibration sensor(s) 742 may measure vibrations of components of the vehicle, such as the axle(s). For example, changes in vibrations may indicate a change in road surfaces. In another example, when two or more vibration sensors 742 are used, the differences between the vibrations may be used to determine friction or slippage of the road surface (e.g., when the difference in vibration is between a power-driven axle and a freely rotating axle).

The vehicle 700 may include an ADAS system 738. The ADAS system 738 may include a SoC, in some examples. The ADAS system 738 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 760, LIDAR sensor(s) 764, and/or a camera(s). The ACC systems may include longitudinal ACC and/or lateral ACC. Longitudinal ACC monitors and controls the distance to the vehicle immediately ahead of the vehicle 700 and automatically adjust the vehicle speed to maintain a safe distance from vehicles ahead. Lateral ACC performs distance keeping, and advises the vehicle 700 to change lanes when necessary. Lateral ACC is related to other ADAS applications such as LCA and CWS.

CACC uses information from other vehicles that may be received via the network interface 724 and/or the wireless antenna(s) 726 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 700), while the I2V communication concept provides information about traffic further ahead. CACC systems may include either or both I2V and V2V information sources. Given the information of the vehicles ahead of the vehicle 700, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 760, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 760, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 700 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 700 if the vehicle 700 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 760, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 700 is backing up. Some RCTW systems include AEB to ensure that the vehicle brakes are applied to avoid a crash. RCTW systems may use one or more rear-facing RADAR sensor(s) 760, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 700, the vehicle 700 itself must, in the case of conflicting results, decide whether to heed the result from a primary computer or a secondary computer (e.g., a first controller 736 or a second controller 736). For example, in some embodiments, the ADAS system 738 may be a backup and/or secondary computer for providing perception information to a backup computer rationality module. The backup computer rationality monitor may run a redundant diverse software on hardware components to detect faults in perception and dynamic driving tasks. Outputs from the ADAS system 738 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 704.

In other examples, ADAS system 738 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 738 may be fed into the primary computer's perception block and/or the primary computer's dynamic driving task block. For example, if the ADAS system 738 indicates a forward crash warning due to an object immediately ahead, the perception block may use this information when identifying objects. In other examples, the secondary computer may have its own neural network which is trained and thus reduces the risk of false positives, as described herein.

The vehicle 700 may further include the infotainment SoC 730 (e.g., an in-vehicle infotainment system (IVI)). Although illustrated and described as a SoC, the infotainment system may not be a SoC, and may include two or more discrete components. The infotainment SoC 730 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 700. For example, the infotainment SoC 730 may radios, disk players, navigation systems, video players, USB and Bluetooth connectivity, carputers, in-car entertainment, Wi-Fi, steering wheel audio controls, hands free voice control, a heads-up display (HUD), an HMI display 734, a telematics device, a control panel (e.g., for controlling and/or interacting with various components, features, and/or systems), and/or other components. The infotainment SoC 730 may further be used to provide information (e.g., visual and/or audible) to a user(s) of the vehicle, such as information from the ADAS system 738, autonomous driving information such as planned vehicle maneuvers, trajectories, surrounding environment information (e.g., intersection information, vehicle information, road information, etc.), and/or other information.

The infotainment SoC 730 may include GPU functionality. The infotainment SoC 730 may communicate over the bus 702 (e.g., CAN bus, Ethernet, etc.) with other devices, systems, and/or components of the vehicle 700. In some examples, the infotainment SoC 730 may be coupled to a supervisory MCU such that the GPU of the infotainment system may perform some self-driving functions in the event that the primary controller(s) 736 (e.g., the primary and/or backup computers of the vehicle 700) fail. In such an example, the infotainment SoC 730 may put the vehicle 700 into a chauffeur to safe stop mode, as described herein.

The vehicle 700 may further include an instrument cluster 732 (e.g., a digital dash, an electronic instrument cluster, a digital instrument panel, etc.). The instrument cluster 732 may include a controller and/or supercomputer (e.g., a discrete controller or supercomputer). The instrument cluster 732 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 730 and the instrument cluster 732. In other words, the instrument cluster 732 may be included as part of the infotainment SoC 730, or vice versa.

Figure 7D:
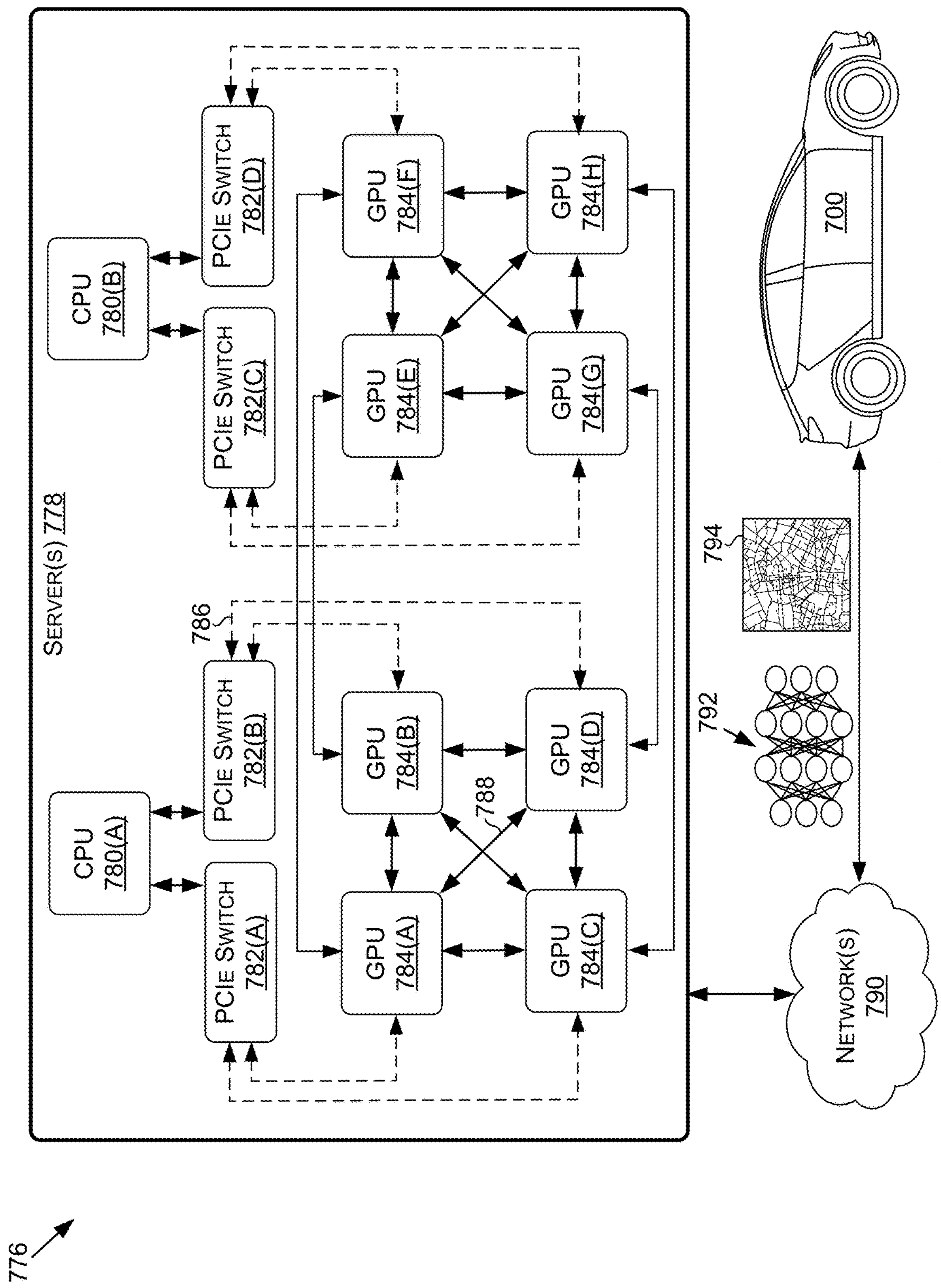
FIG. 7D is a system diagram for communication between cloud-based server(s) and the example autonomous vehicle of FIG. 7A, in accordance with some embodiments of the present disclosure.

FIG. 7D is a system diagram for communication between cloud-based server(s) and the example autonomous vehicle 700 of FIG. 7A, in accordance with some embodiments of the present disclosure. The system 776 may include server(s) 778, network(s) 790, and vehicles, including the vehicle 700. The server(s) 778 may include a plurality of GPUs 784(A)-784(H) (collectively referred to herein as GPUs 784), PCIe switches 782(A)-782(H) (collectively referred to herein as PCIe switches 782), and/or CPUs 780(A)-780(B) (collectively referred to herein as CPUs 780). The GPUs 784, the CPUs 780, and the PCIe switches may be interconnected with high-speed interconnects such as, for example and without limitation, NVLink interfaces 788 developed by NVIDIA and/or PCIe connections 786. In some examples, the GPUs 784 are connected via NVLink and/or NVSwitch SoC and the GPUs 784 and the PCIe switches 782 are connected via PCIe interconnects. Although eight GPUs 784, two CPUs 780, and two PCIe switches are illustrated, this is not intended to be limiting. Depending on the embodiment, each of the server(s) 778 may include any number of GPUs 784, CPUs 780, and/or PCIe switches. For example, the server(s) 778 may each include eight, sixteen, thirty-two, and/or more GPUs 784.

The server(s) 778 may receive, over the network(s) 790 and from the vehicles, image data representative of images showing unexpected or changed road conditions, such as recently commenced road-work. The server(s) 778 may transmit, over the network(s) 790 and to the vehicles, neural networks 792, updated neural networks 792, and/or map information 794, including information regarding traffic and road conditions. The updates to the map information 794 may include updates for the HD map 722, such as information regarding construction sites, potholes, detours, flooding, and/or other obstructions. In some examples, the neural networks 792, the updated neural networks 792, and/or the map information 794 may have resulted from new training and/or experiences represented in data received from any number of vehicles in the environment, and/or based on training performed at a datacenter (e.g., using the server(s) 778 and/or other servers).

The server(s) 778 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 790, and/or the machine learning models may be used by the server(s) 778 to remotely monitor the vehicles.

In some examples, the server(s) 778 may receive data from the vehicles and apply the data to up-to-date real-time neural networks for real-time intelligent inferencing. The server(s) 778 may include deep-learning supercomputers and/or dedicated AI computers powered by GPU(s) 784, such as a DGX and DGX Station machines developed by NVIDIA. However, in some examples, the server(s) 778 may include deep learning infrastructure that use only CPU-powered datacenters.

The deep-learning infrastructure of the server(s) 778 may be capable of fast, real-time inferencing, and may use that capability to evaluate and verify the health of the processors, software, and/or associated hardware in the vehicle 700. For example, the deep-learning infrastructure may receive periodic updates from the vehicle 700, such as a sequence of images and/or objects that the vehicle 700 has located in that sequence of images (e.g., via computer vision and/or other machine learning object classification techniques). The deep-learning infrastructure may run its own neural network to identify the objects and compare them with the objects identified by the vehicle 700 and, if the results do not match and the infrastructure concludes that the AI in the vehicle 700 is malfunctioning, the server(s) 778 may transmit a signal to the vehicle 700 instructing a fail-safe computer of the vehicle 700 to assume control, notify the passengers, and complete a safe parking maneuver.

For inferencing, the server(s) 778 may include the GPU(s) 784 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 8:
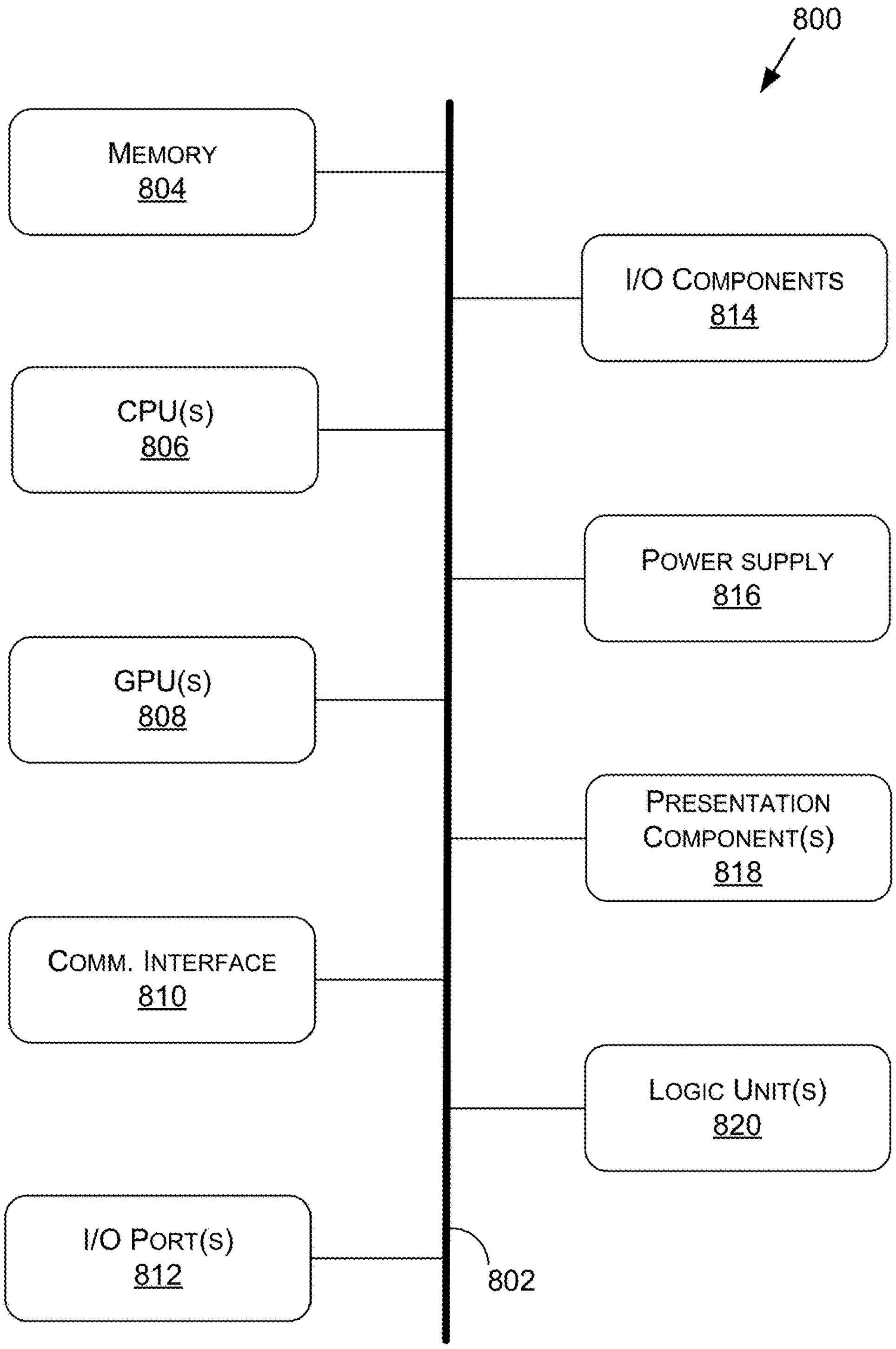
FIG. 8 is a block diagram of an example computing device suitable for use in implementing some embodiments of the present disclosure.

FIG. 8 is a block diagram of an example computing device(s) 800 suitable for use in implementing some embodiments of the present disclosure. Computing device 800 may include an interconnect system 802 that directly or indirectly couples the following devices: memory 804, one or more central processing units (CPUs) 806, one or more graphics processing units (GPUs) 808, a communication interface 810, input/output (I/O) ports 812, input/output components 814, a power supply 816, one or more presentation components 818 (e.g., display(s)), and one or more logic units 820. In at least one embodiment, the computing device(s) 800 may comprise one or more virtual machines (VMs), and/or any of the components thereof may comprise virtual components (e.g., virtual hardware components). For non-limiting examples, one or more of the GPUs 808 may comprise one or more vGPUs, one or more of the CPUs 806 may comprise one or more vCPUs, and/or one or more of the logic units 820 may comprise one or more virtual logic units. As such, a computing device(s) 800 may include discrete components (e.g., a full GPU dedicated to the computing device 800), virtual components (e.g., a portion of a GPU dedicated to the computing device 800), or a combination thereof.

Although the various blocks of FIG. 8 are shown as connected via the interconnect system 802 with lines, this is not intended to be limiting and is for clarity only. For example, in some embodiments, a presentation component 818, such as a display device, may be considered an I/O component 814 (e.g., if the display is a touch screen). As another example, the CPUs 806 and/or GPUs 808 may include memory (e.g., the memory 804 may be representative of a storage device in addition to the memory of the GPUs 808, the CPUs 806, and/or other components). In other words, the computing device of FIG. 8 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 8.

The interconnect system 802 may represent one or more links or busses, such as an address bus, a data bus, a control bus, or a combination thereof. The interconnect system 802 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 806 may be directly connected to the memory 804. Further, the CPU 806 may be directly connected to the GPU 808. Where there is direct, or point-to-point connection between components, the interconnect system 802 may include a PCIe link to carry out the connection. In these examples, a PCI bus need not be included in the computing device 800.

The memory 804 may include any of a variety of computer-readable media. The computer-readable media may be any available media that may be accessed by the computing device 800. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 804 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 800. As used herein, computer storage media does not comprise signals per sc.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 806 may be configured to execute at least some of the computer-readable instructions to control one or more components of the computing device 800 to perform one or more of the methods and/or processes described herein. The CPU(s) 806 may each include one or more cores (e.g., one, two, four, eight, twenty-eight, seventy-two, etc.) that are capable of handling a multitude of software threads simultaneously. The CPU(s) 806 may include any type of processor, and may include different types of processors depending on the type of computing device 800 implemented (e.g., processors with fewer cores for mobile devices and processors with more cores for servers). For example, depending on the type of computing device 800, the processor may be an Advanced RISC Machines (ARM) processor implemented using Reduced Instruction Set Computing (RISC) or an x86 processor implemented using Complex Instruction Set Computing (CISC). The computing device 800 may include one or more CPUs 806 in addition to one or more microprocessors or supplementary co-processors, such as math co-processors.

In addition to or alternatively from the CPU(s) 806, the GPU(s) 808 may be configured to execute at least some of the computer-readable instructions to control one or more components of the computing device 800 to perform one or more of the methods and/or processes described herein. One or more of the GPU(s) 808 may be an integrated GPU (e.g., with one or more of the CPU(s) 806 and/or one or more of the GPU(s) 808 may be a discrete GPU. In embodiments, one or more of the GPU(s) 808 may be a coprocessor of one or more of the CPU(s) 806. The GPU(s) 808 may be used by the computing device 800 to render graphics (e.g., 3D graphics) or perform general purpose computations. For example, the GPU(s) 808 may be used for General-Purpose computing on GPUs (GPGPU). The GPU(s) 808 may include hundreds or thousands of cores that are capable of handling hundreds or thousands of software threads simultaneously. The GPU(s) 808 may generate pixel data for output images in response to rendering commands (e.g., rendering commands from the CPU(s) 806 received via a host interface). The GPU(s) 808 may include graphics memory, such as display memory, for storing pixel data or any other suitable data, such as GPGPU data. The display memory may be included as part of the memory 804. The GPU(s) 808 may include two or more GPUs operating in parallel (e.g., via a link). The link may directly connect the GPUs (e.g., using NVLINK) or may connect the GPUs through a switch (e.g., using NVSwitch). When combined together, each GPU 808 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 806 and/or the GPU(s) 808, the logic unit(s) 820 may be configured to execute at least some of the computer-readable instructions to control one or more components of the computing device 800 to perform one or more of the methods and/or processes described herein. In embodiments, the CPU(s) 806, the GPU(s) 808, and/or the logic unit(s) 820 may discretely or jointly perform any combination of the methods, processes and/or portions thereof. One or more of the logic units 820 may be part of and/or integrated in one or more of the CPU(s) 806 and/or the GPU(s) 808 and/or one or more of the logic units 820 may be discrete components or otherwise external to the CPU(s) 806 and/or the GPU(s) 808. In embodiments, one or more of the logic units 820 may be a coprocessor of one or more of the CPU(s) 806 and/or one or more of the GPU(s) 808.

Examples of the logic unit(s) 820 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Trec Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 810 may include one or more receivers, transmitters, and/or transceivers that enable the computing device 800 to communicate with other computing devices via an electronic communication network, included wired and/or wireless communications. The communication interface 810 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 820 and/or communication interface 810 may include one or more data processing units (DPUs) to transmit data received over a network and/or through interconnect system 802 directly to (e.g., a memory of) one or more GPU(s) 808.

The I/O ports 812 may enable the computing device 800 to be logically coupled to other devices including the I/O components 814, the presentation component(s) 818, and/or other components, some of which may be built in to (e.g., integrated in) the computing device 800. Illustrative I/O components 814 include a microphone, mouse, keyboard, joystick, game pad, game controller, satellite dish, scanner, printer, wireless device, etc. The I/O components 814 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may be include depth cameras, such as stereoscopic camera systems, infrared camera systems, RGB camera systems, touchscreen technology, and combinations of these, for gesture detection and recognition. Additionally, the computing device 800 may include accelerometers or gyroscopes (e.g., as part of an inertia measurement unit (IMU)) that enable detection of motion. In some examples, the output of the accelerometers or gyroscopes may be used by the computing device 800 to render immersive augmented reality or virtual reality.

The power supply 816 may include a hard-wired power supply, a battery power supply, or a combination thereof. The power supply 816 may provide power to the computing device 800 to enable the components of the computing device 800 to operate.

The presentation component(s) 818 may include a display (e.g., a monitor, a touch screen, a television screen, a heads-up-display (HUD), other display types, or a combination thereof), speakers, and/or other presentation components. The presentation component(s) 818 may receive data from other components (e.g., the GPU(s) 808, the CPU(s) 806, DPUs, etc.), and output the data (e.g., as an image, video, sound, etc.).

Example Data Center

Figure 9:
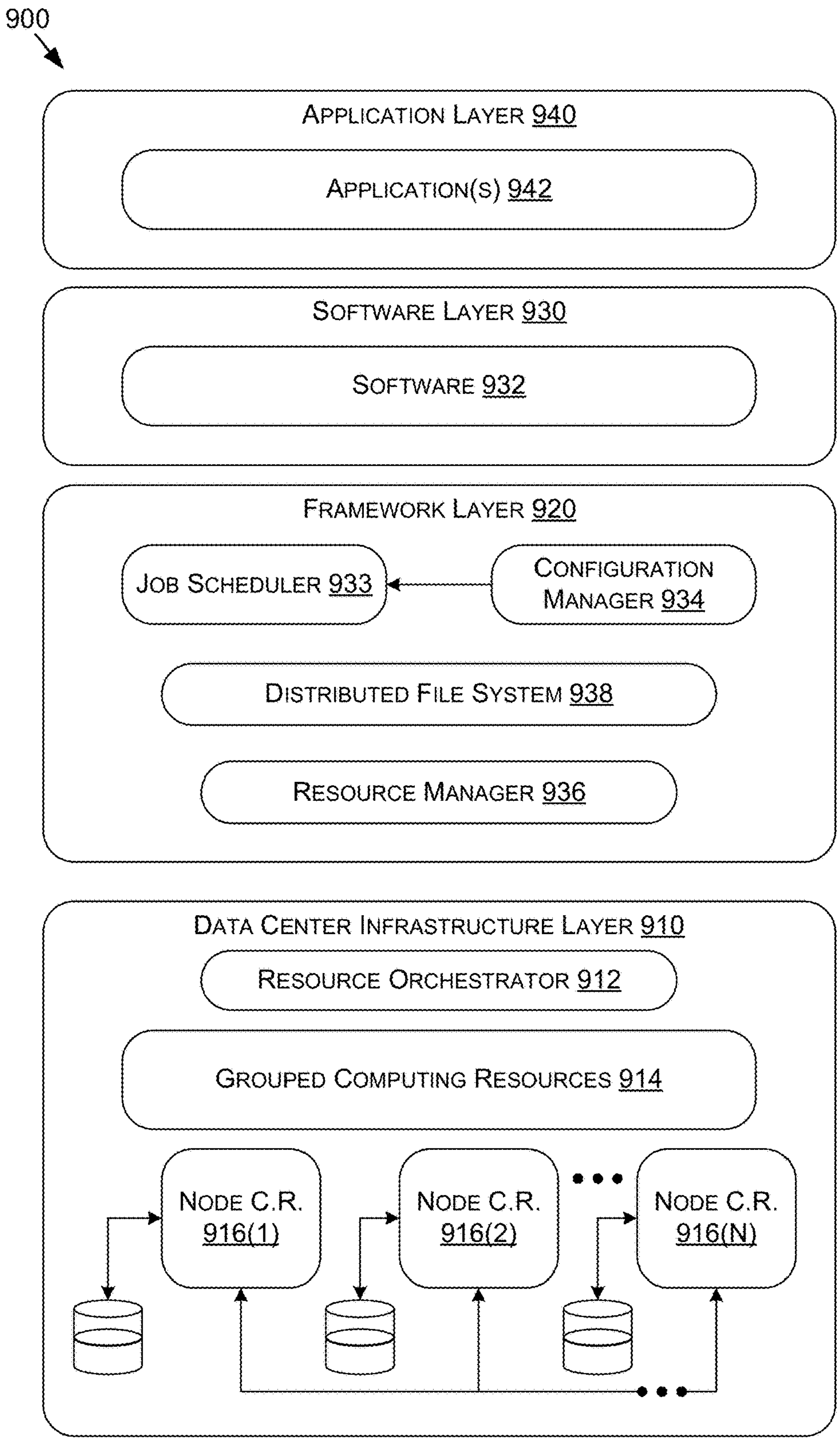
FIG. 9 is a block diagram of an example data center suitable for use in implementing some embodiments of the present disclosure.

FIG. 9 illustrates an example data center 900 that may be used in at least one embodiments of the present disclosure. The data center 900 may include a data center infrastructure layer 910, a framework layer 920, a software layer 930, and/or an application layer 940.

As shown in FIG. 9, the data center infrastructure layer 910 may include a resource orchestrator 912, grouped computing resources 914, and node computing resources ("node C.R.s") 916(1)-916(N), where "N" represents any whole, positive integer. In at least one embodiment, node C.R.s 916(1)-916(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 916(1)-916(N) may correspond to a server having one or more of the above-mentioned computing resources. In addition, in some embodiments, the node C.R.s 916(1)-9161(N) may include one or more virtual components, such as vGPUs, vCPUs, and/or the like, and/or one or more of the node C.R.s 916(1)-916(N) may correspond to a virtual machine (VM).

In at least one embodiment, grouped computing resources 914 may include separate groupings of node C.R.s 916 housed within one or more racks (not shown), or many racks housed in data centers at various geographical locations (also not shown). Separate groupings of node C.R.s 916 within grouped computing resources 914 may include grouped compute, network, memory or storage resources that may be configured or allocated to support one or more workloads. In at least one embodiment, several node C.R.s 916 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 912 may configure or otherwise control one or more node C.R.s 916(1)-916(N) and/or grouped computing resources 914. In at least one embodiment, resource orchestrator 912 may include a software design infrastructure (SDI) management entity for the data center 900. The resource orchestrator 912 may include hardware, software, or some combination thereof.

In at least one embodiment, as shown in FIG. 9, framework layer 920 may include a job scheduler 933, a configuration manager 934, a resource manager 936, and/or a distributed file system 938. The framework layer 920 may include a framework to support software 932 of software layer 930 and/or one or more application(s) 942 of application layer 940. The software 932 or application(s) 942 may respectively include web-based service software or applications, such as those provided by Amazon Web Services, Google Cloud and Microsoft Azure. The framework layer 920 may be, but is not limited to, a type of free and open-source software web application framework such as Apache Spark™ (hereinafter "Spark") that may utilize distributed file system 938 for large-scale data processing (e.g., "big data"). In at least one embodiment, job scheduler 933 may include a Spark driver to facilitate scheduling of workloads supported by various layers of data center 900. The configuration manager 934 may be capable of configuring different layers such as software layer 930 and framework layer 920 including Spark and distributed file system 938 for supporting large-scale data processing. The resource manager 936 may be capable of managing clustered or grouped computing resources mapped to or allocated for support of distributed file system 938 and job scheduler 933. In at least one embodiment, clustered or grouped computing resources may include grouped computing resource 914 at data center infrastructure layer 910. The resource manager 936 may coordinate with resource orchestrator 912 to manage these mapped or allocated computing resources.

In at least one embodiment, software 932 included in software layer 930 may include software used by at least portions of node C.R.s 916(1)-916(N), grouped computing resources 914, and/or distributed file system 938 of framework layer 920. One or more types of software may include, but are not limited to, Internet web page search software, e-mail virus scan software, database software, and streaming video content software.

In at least one embodiment, application(s) 942 included in application layer 940 may include one or more types of applications used by at least portions of node C.R.s 916(1)-916(N), grouped computing resources 914, and/or distributed file system 938 of framework layer 920. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 934, resource manager 936, and resource orchestrator 912 may implement any number and type of self-modifying actions based on any amount and type of data acquired in any technically feasible fashion. Self-modifying actions may relieve a data center operator of data center 900 from making possibly bad configuration decisions and possibly avoiding underutilized and/or poor performing portions of a data center.

The data center 900 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 900. In at least one embodiment, trained or deployed machine learning models corresponding to one or more neural networks may be used to infer or predict information using resources described above with respect to the data center 900 by using weight parameters calculated through one or more training techniques, such as but not limited to those described herein.

In at least one embodiment, the data center 900 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 800 of FIG. 8—e.g., each device may include similar components, features, and/or functionality of the computing device(s) 800. In addition, where backend devices (e.g., servers, NAS, etc.) are implemented, the backend devices may be included as part of a data center 900, an example of which is described in more detail herein with respect to FIG. 9.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 800 described herein with respect to FIG. 8. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:

performing one or more operations for a machine using a trajectory determined using one or more machine learning models (MLMs), the one or more MLMs trained, at least, by:

determining, using the one or more MLMs and testing data corresponding to synthetic sensor perspectives, trajectories associated with the synthetic sensor perspectives, the synthetic sensor perspectives including augmentation artifacts introduced during generation of the testing data;

evaluating at least one difference between a first set of the trajectories and a second set of the trajectories; and quantifying a reliance of the one or more MLMs on the augmentation artifacts based at least on the evaluating of the at least one difference.

2. The method of claim 1, wherein the augmentation artifacts correspond to viewpoint transformations applied to sensor perspectives to generate the synthetic sensor perspectives.

3. The method of claim 1, wherein the quantifying includes computing a reliance score representing the reliance and corresponding to a magnitude of the at least one difference between the first set of the trajectories and the second set of the trajectories.

4. The method of claim 1, wherein the at least one difference is in performance of the one or more MLMs for the first set of the trajectories in comparison to the second set of the trajectories.

5. The method of claim 1, wherein a magnitude of the reliance of the one or more MLMs on the augmentation artifacts corresponds to a magnitude of the at least one difference.

6. The method of claim 1, wherein the at least one difference corresponds to distances between locations corresponding to the trajectories and reference locations for the trajectories.

7. The method of claim 1, wherein the first set of the trajectories corresponds to a first set of the synthetic sensor perspectives that are generated based at least on shifting one or more first values of one or more image characteristics in one or more first directions and the second set of the trajectories corresponds to a second set of the synthetic sensor perspectives that are generated based at least on shifting one or more second values of the one or more image characteristics in one or more second directions different from the one or more first directions.

8. The method of claim 1, wherein the one or more MLMs are further trained, at least, by updating one or more parameters of the one or more MLMs based at least on the reliance exceeding a threshold.

9. The method of claim 1, wherein the quantifying includes computing one or more values representing at least one absolute deviation between the at least one difference between the first set of the trajectories and the second set of the trajectories.

10. A system comprising:

one or more processors to perform one or more operations for a machine using one or more machine learning models (MLMs), the one or more MLMs trained, at least, by:

determining, using the one or more MLMs and testing data corresponding to synthetic sensor perspectives, outputs associated with the synthetic sensor perspectives, the synthetic sensor perspectives including artifacts introduced during generation of the testing data;

evaluating at least one difference between a first set of the outputs and a second set of the outputs; and quantifying a reliance of the one or more MLMs on the artifacts based at least on the evaluating of the at least one difference.

11. The system of claim 10, wherein the artifacts correspond to viewpoint transformations applied to sensor perspectives to generate the synthetic sensor perspectives.

12. The system of claim 10, wherein the quantifying includes computing a reliance score representing the reliance and corresponding to a magnitude of the at least one difference between the first set of the outputs and the second set of the outputs.

13. The system of claim 10, wherein the at least one difference is in performance of the one or more MLMs for the first set of the outputs in comparison to the second set of the outputs.

14. The system of claim 10, wherein a magnitude of the reliance of the one or more MLMs on the artifacts corresponds to a magnitude of the at least one difference.

15. The system of claim 10, wherein the at least one difference corresponds to distances between locations corresponding to the outputs and reference locations for the outputs.

16. The system of claim 10, wherein the system is comprised in at least one of:

a control system for an autonomous or semi-autonomous machine;

a perception system for an autonomous or semi-autonomous machine;

a system for performing one or more simulation operations;

a system for performing light transport simulation;

a system for performing collaborative content creation for 3D assets;

a system implemented using a robot;

a system for performing one or more generative AI operations;

a system for generating synthetic data;

a system for presenting at least one of virtual reality content, augmented reality content, or mixed reality content;

a system incorporating one or more virtual machines (VMs);

a system implemented at least partially in a data center; or a system implemented at least partially using cloud computing resources.

17. At least one processor comprising:

one or more circuits to perform one or more operations for a machine using one or more machine learning models (MLMs), the one or more MLMs trained, at least, by:

determining, using the one or more MLMs and simulation data generated using a simulator of one or more three-dimensional (3D) virtual environments, outputs associated with the simulation data, the simulation data including artifacts produced by the simulator;

evaluating at least one difference between a first set of the outputs and a second set of the outputs; and quantifying a reliance of the one or more MLMs on the artifacts based at least on the evaluating of the at least one difference.

18. The at least one processor of claim 17, wherein the artifacts correspond to viewpoint transformations applied to sensor perspectives to generate the simulation data.

19. The at least one processor of claim 17, wherein the artifacts include one or more of out-of-domain artifacts or augmentation artifacts.

20. The at least one processor of claim 17, wherein the at least one processor is comprised in at least one of:

a control system for an autonomous or semi-autonomous machine;

a perception system for an autonomous or semi-autonomous machine;

a system for performing one or more simulation operations;

a system for performing light transport simulation;

a system for performing collaborative content creation for 3D assets;

a system implemented using a robot;

a system for performing one or more generative AI operations;

a system for generating synthetic data;

a system for presenting at least one of virtual reality content, augmented reality content, or mixed reality content;

a system incorporating one or more virtual machines (VMs);

a system implemented at least partially in a data center; or a system implemented at least partially using cloud computing resources.

* * * * *